(12) United States Patent
Hailpern et al.

(10) Patent No.: US 10,869,009 B2
(45) Date of Patent: Dec. 15, 2020

(54) INTERACTIVE DISPLAY

(71) Applicant: HEWLETT-PACKARD DEVELOPMENT COMPANY, L.P., Houston, TX (US)

(72) Inventors: Joshua Hailpern, Sunnyvale, CA (US); Murilo Juchem, Vancouver, WA (US)

(73) Assignee: Hewlett-Packard Development Company, L.P., Spring, TX (US)

( * ) Notice: Subject to any disclaimer, the term of this patent is extended or adjusted under 35 U.S.C. 154(b) by 144 days.

(21) Appl. No.: 15/764,869

(22) PCT Filed: Sep. 30, 2015

(86) PCT No.: PCT/US2015/053191
§ 371 (c)(1),
(2) Date: Mar. 29, 2018

(87) PCT Pub. No.: WO2017/058199
PCT Pub. Date: Apr. 6, 2017

(65) Prior Publication Data
US 2018/0278899 A1 Sep. 27, 2018

(51) Int. Cl.
*H04N 9/31* (2006.01)
*G03B 21/14* (2006.01)
*G06F 3/01* (2006.01)
*G06F 3/041* (2006.01)
*G06T 7/586* (2017.01)
(Continued)

(52) U.S. Cl.
CPC ........... *H04N 9/3147* (2013.01); *G06F 3/017* (2013.01); *G06F 3/0418* (2013.01); *G06K 9/00362* (2013.01); *G06T 5/50* (2013.01); *G06T 7/586* (2017.01); *G06T 7/70* (2017.01); *G06T 7/80* (2017.01); *H04N 9/315* (2013.01); *H04N 9/3185* (2013.01); *H04N 9/3194* (2013.01); *G06F 3/0425* (2013.01); *G06T 2207/10048* (2013.01)

(58) Field of Classification Search
CPC ........ H04N 9/3194; G03B 21/14; G06F 3/017
See application file for complete search history.

(56) References Cited

U.S. PATENT DOCUMENTS

| 7,015,954 B1 | 3/2006 | Foote et al. |
| 7,348,963 B2 | 3/2008 | Bell |

(Continued)

FOREIGN PATENT DOCUMENTS

| CN | 101547332 | 9/2009 |
| CN | 102843517 | 12/2012 |

(Continued)

OTHER PUBLICATIONS

"SMART Board 600i Interactive Whiteboard System", Sep. 7, 2012.
(Continued)

*Primary Examiner* — Ryan D Howard
(74) *Attorney, Agent, or Firm* — Fabian VanCott

(57) ABSTRACT

An imaging device for an interactive display includes at least one image projector to project an image onto a display area. The imaging device further includes a number of image capture devices to capture at least one image of the display area, and a number of sensors to detect the presence of an object within the field of view of the image capture devices.

20 Claims, 13 Drawing Sheets

(51) Int. Cl.
*G06T 7/80* (2017.01)
*G06T 7/70* (2017.01)
*G06K 9/00* (2006.01)
*G06T 5/50* (2006.01)
*G06F 3/042* (2006.01)

(56) References Cited

U.S. PATENT DOCUMENTS

| | | |
|---|---|---|
| 8,128,241 B2 | 3/2012 | Bishop |
| 2011/0157101 A1 | 6/2011 | Chang |
| 2011/0298722 A1 | 12/2011 | Tse et al. |
| 2012/0320158 A1 | 12/2012 | Junuzovic et al. |
| 2013/0038524 A1 | 2/2013 | Otsuki et al. |
| 2013/0050145 A1 | 2/2013 | Robinson et al. |
| 2013/0127716 A1* | 5/2013 | Nagashima .......... H04N 9/3129 345/158 |
| 2013/0195419 A1 | 8/2013 | Hayashi |
| 2013/0293677 A1 | 11/2013 | Lee et al. |
| 2014/0101578 A1 | 4/2014 | Kwak et al. |
| 2014/0192268 A1 | 7/2014 | Petrisor |
| 2014/0313165 A1 | 10/2014 | Lam et al. |
| 2015/0205345 A1 | 7/2015 | Naess et al. |

FOREIGN PATENT DOCUMENTS

| | | |
|---|---|---|
| CN | 103809910 | 5/2014 |
| CN | 104025151 | 9/2014 |
| TW | M381829 U1 | 6/2010 |
| TW | 201419042 A | 5/2014 |

OTHER PUBLICATIONS

Edge Whiteboard, https://gigaom.com/2011/09/30/capture-what-you-draw-in-real-time-with-ebeam-edge-whiteboard/.
Interactive Whiteboard, http://www.mimio.com/en-NA/Products/MimioTeach-interactive-Whiteboard.aspx.
LiveWhiteboard, http://research.microsoft.com/en-us/um/people/zhang/WhiteboardStreaming/LiveWhiteboard.pdf.
Whiteboard Camera, http://vis.uky.edu/~gravity/Research/procam_miao/Projector-Whiteboard-Camera%20System%20for%20Remote%20Collaboration.htm.

* cited by examiner

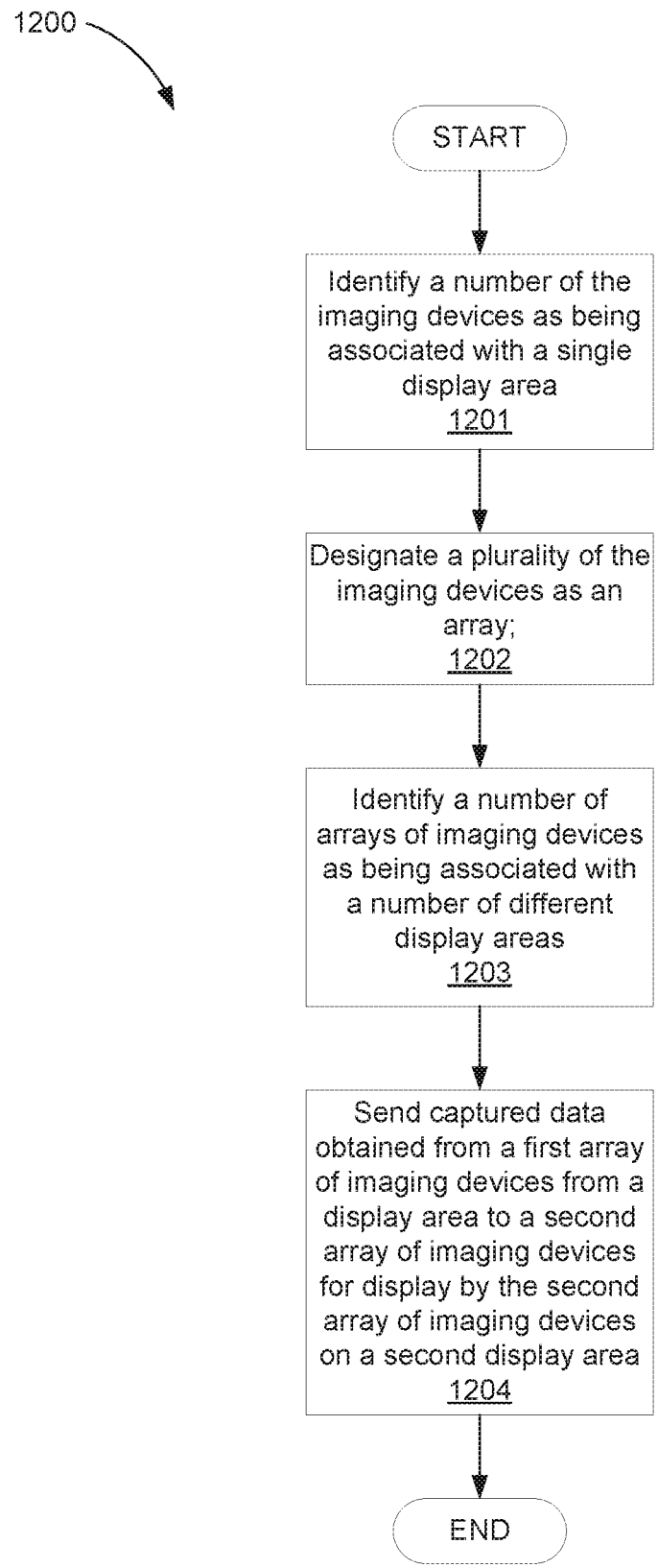

INTERACTIVE DISPLAY

BACKGROUND

A whiteboard or dry-erase board is any glossy surface used to create nonpermanent, erasable markings. Some whiteboards include a white glossy surface that contrasts with colored markings from, for example, dry-erase markers, made thereon. Whiteboards allow for rapid marking and erasing of markings on their surfaces. The popularity of whiteboards increased rapidly in the mid-1990s, and has become a fixture in many offices, meeting rooms, school classrooms, and other work environments.

BRIEF DESCRIPTION OF THE DRAWINGS

The accompanying drawings illustrate various examples of the principles described herein and are a part of the specification. The illustrated examples are given merely for illustration, and do not limit the scope of the claims.

FIG. 12 is a flowchart showing a room switching process, according to one example of the principles described herein.

Throughout the drawings, identical reference numbers designate similar, but not necessarily identical, elements.

DETAILED DESCRIPTION

Figure 1:
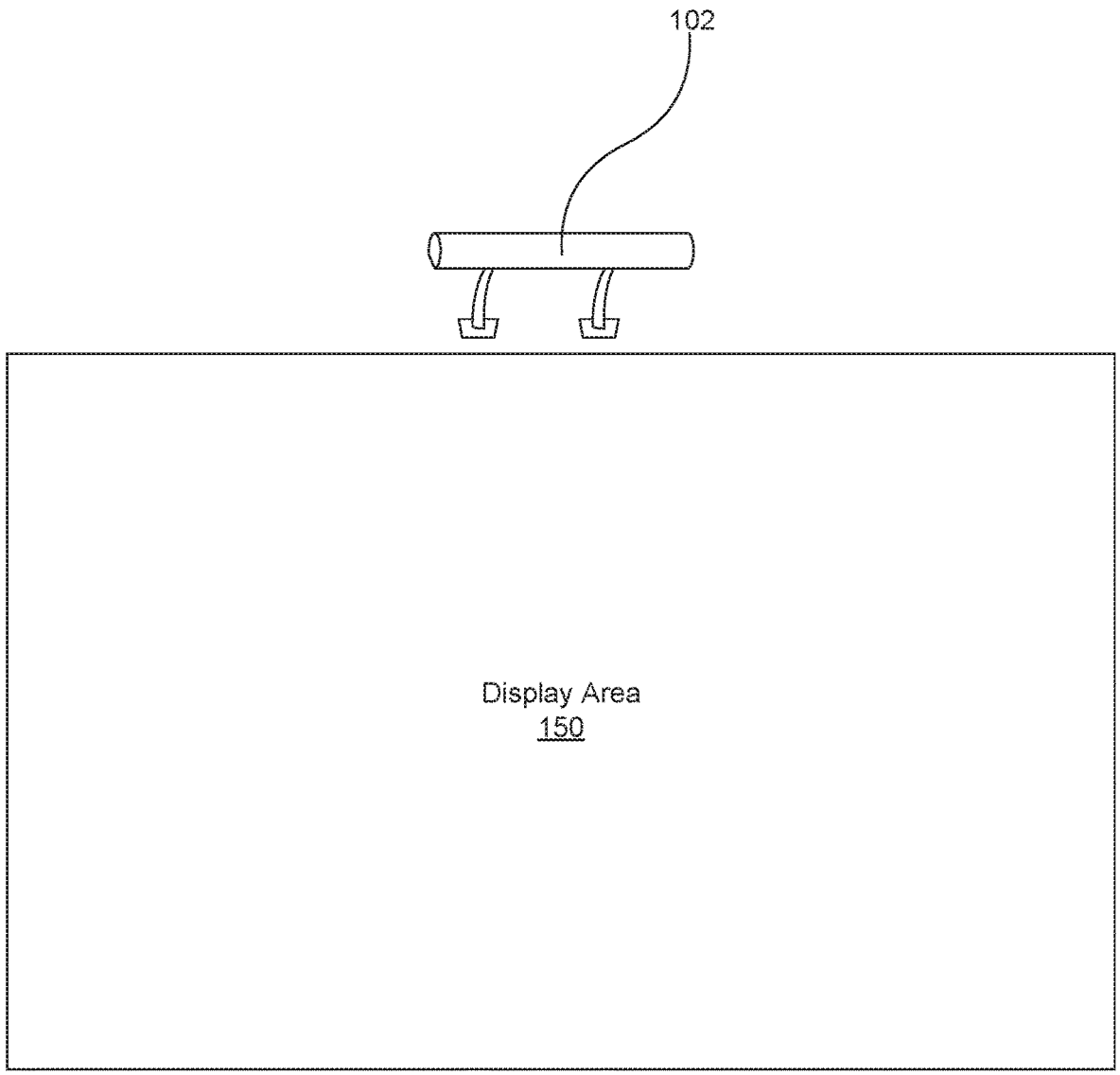
FIG. 1 is a diagram of an imaging device mounted adjacent to a display area, according to one example of the principles described herein.

Whiteboards are used as tools that spur collaboration and idea generation in offices, meeting rooms, school classrooms, and other work environments. These types of whiteboards may be referred to as "dumb" or "passive" whiteboards that may be defined as any surface a user may mark with a writing device, but where the whiteboard does not include electronic devices. These devices are different from digital whiteboards described below.

Whiteboards have significant disadvantages including the inability to digitally capture what is presented on the whiteboard during collaborative meetings. Being able to digitally capture information presented on a whiteboard throughout a collaborative meeting allows for a user to refer back to that information well after the collaborative meeting, and allows for individuals who were not present at the collaborative meeting to become informed as to what was discussed therein.

Further, white boards themselves are not transportable. Thus, information written thereon, even if retained, cannot be shared with other individuals who are not located at the same facility. Still further, the evolution of the ideas discussed and written on the whiteboard during collaboration are also lost, leaving team members with only the final state to record using, for example, cameras or other image capture devices. In this manner, whiteboards work well as process tools, but are poor archival or resumption tools. Even still further, when users erase information from a whiteboard in order to make room for more space, that erased information is simply lost.

Digital whiteboards are whiteboards whose functionality is augmented by a connected computing device. In one example, a projector projects a computing device's desktop onto the whiteboard's surface where users control the computing device using a pen, finger, stylus, or other device. Digital whiteboards capture all content digitally. Using very large displays with digital markers or special whiteboards with hundreds of sensors and special markers that detect and track user actions has provided the means by which the digital whiteboards capture information digitally. In some examples, digital whiteboards may use very large electronic displays with specialized digital markers, or specialized white boards with hundreds of sensors and specialized markers that may track movement of the specialized digital markers as the user moves the specialized markers across the surface of the specialized white boards. In other examples of digital whiteboards, transparencies may be used on top of a whiteboard. These transparencies may be rolled through the surface of the whiteboard so that as people write, the transparency moves, keeping old content archived using an optical scanner, for example, to read in content as it moves over the rolls.

However, the specialized markers are expensive due to the electronic elements contained therein, run out of ink, and are simply not comfortable or easy to pick up and use.

Further, these types of digital whiteboard technologies are extremely expensive, cumbersome, and their value add is hard to realize for end users. This allows only the most affluent entities and individuals to own these types of systems. Further, these expensive devices often remain generally unused. In this manner, digital whiteboards cannot compete with a passive whiteboard by way of marketability, cost, and level of use in the market.

Examples described herein provide an imaging device for an interactive display. The imaging device may be mounted to a wall juxtaposition to a passive whiteboard such as, for example, just above the passive whiteboard, or directly on the passive whiteboard. This allows for an easier installed system that also provides for easier calibration than, for example, systems that project images from an image projection system located on a wall behind a user of the whiteboard or another distant location.

The imaging device includes, at least one image projector to project an image onto a display area, a number of image capture devices to capture at least one image of the display area, and a number of sensors to detect the presence of an object within the field of view of the image capture devices. In one example, the imaging device is mounted on a surface on which the display area is located. The imaging device transmits data to and from a curation device. The curator device to process images for the imaging device.

Examples described herein also provide an interactive display system. The interactive display system includes a number of imaging devices mounted adjacent to at least one display area. The imaging devices each include at least one image projector to project an image onto the display area, a number of image capture devices to capture at least one image of the display area, and a number of sensors to detect the presence of an object within the field of view of the image capture devices. In one example, the display area is a whiteboard. In this example, the whiteboard is a passive whiteboard. The imaging devices comprise a number of light illumination devices to illuminate the display area.

In one example, the number of sensors include a plurality of sensors. The plurality of sensors detect depth of the object relative to the surface of the display area, location of the object, the type of object, or combinations thereof. In one example, the number of imaging devices include a plurality of imaging devices. In this example, the plurality of imaging devices form an array of imaging devices, and the sensors of the array of imaging devices process images from a number of different perspectives defined by the positioning of the imaging devices within the array relative to one another.

The interactive display system may further include a data synchronization device. The data synchronization device synchronizes images captured by the plurality of image capture devices, and synchronizes images projected by the at least one image projector of each imaging devices. The interactive display system may further include a data storage device to archive data processed by the data synchronization device. Synchronizing images captured by the plurality of image capture devices includes stitching images captured by the plurality of image capture devices to remove occluded portions of the display area.

In one example, the image capture devices may include at least two image capturing devices. A first image capturing device may include a relatively higher resolution image capturing device relative to a second image capturing device. The interactive display system may use the first image capturing device to capture images of the display area, and may use the second image capturing device to position of objects in front of the interactive display system.

In one example, the interactive display system processes data obtained by the sensors to identify a body part of a first user relative to another user.

Examples described herein also provide a computer program product for an interactive a display. The computer program product includes a computer readable storage medium including computer usable program code embodied therewith. The computer usable program code, when executed by a processor, with a number of image capture devices of a plurality of imaging devices mounted adjacent to at least one display area, detect a number of markings on a surface of the display area. The markings are captured from a plurality of perspectives. The captured images are digitally stitched together to form a single image; Further, the captured images may be tome coded to preserve evolution of the markings on the display area.

The computer program product may further include computer usable program code to, when executed by the processor, cause the imaging devices to project a light sequence onto the display area. The imaging devices may be calibrated based on the light sequence in order to account for distortion caused by the angle of the imaging devices relative to a surface of the display area and distance of the imaging devices from the surface of the display area.

The computer program product may further include computer usable program code to, when executed by the processor, identify a number of the imaging devices as being associated with a single display area, and designate a plurality of the imaging devices as an array. A number of arrays of imaging devices may be identified as being associated with a number of different display areas. Further, captured data obtained from a first array of imaging devices may be sent from a display area to a second array of imaging devices for display by the second array of imaging devices on a second display area.

As used in the present specification and in the appended claims, the term "dumb whiteboard" or "passive whiteboard" is meant to be understood broadly as any surface a user may mark with a writing device, but where the whiteboard does not include electronic devices.

Even still further, as used in the present specification and in the appended claims, the term "a number of" or similar language is meant to be understood broadly as any positive number including 1 to infinity; zero not being a number, but the absence of a number.

In the following description, for purposes of explanation, numerous specific details are set forth in order to provide a thorough understanding of the present systems and methods. It will be apparent, however, to one skilled in the art that the present apparatus, systems, and methods may be practiced without these specific details. Reference in the specification to "an example" or similar language means that a particular feature, structure, or characteristic described in connection with that example is included as described, but may not be included in other examples.

Turning now to the figures, FIG. 1 is a diagram of an imaging device (102) mounted adjacent to a display area (150), according to one example of the principles described herein. Throughout the present application, the whiteboard will be referred to as a display area. The display area (150) may be a "passive" whiteboard. In this example, the passive whiteboard is any surface that may be written on such as a dry-erase board that includes a glossy, white surface for nonpermanent markings. In one example, passive whiteboards are made of laminated chipboard with a polyester or acrylic coating disposed thereon. However, in another example, the display area (150) may be any surface on which erasable marks may be made such as a coated wall or other surface. In still another example, the display area (150) may be any surface that is ambulatory such as a whiteboard with wheels and/or a frame attached thereto.

The imaging device (102), when used in conjunction with the display area (150), modifies the otherwise "passive" surface that is the display area (150) into an interactive, digital collaboration space. Thus, with the installation of at least one imaging device (102) adjacent to a display area (150), the display area (150) becomes a digital whiteboard without the expense involved in purchasing a digital whiteboard. In this example, an existing passive whiteboard may be retrofitted with at least one of the imaging devices (102) to provide user-interactivity, digital capture and presentation of information with relation to the display area (150), and other functions described herein.

Figure 2:
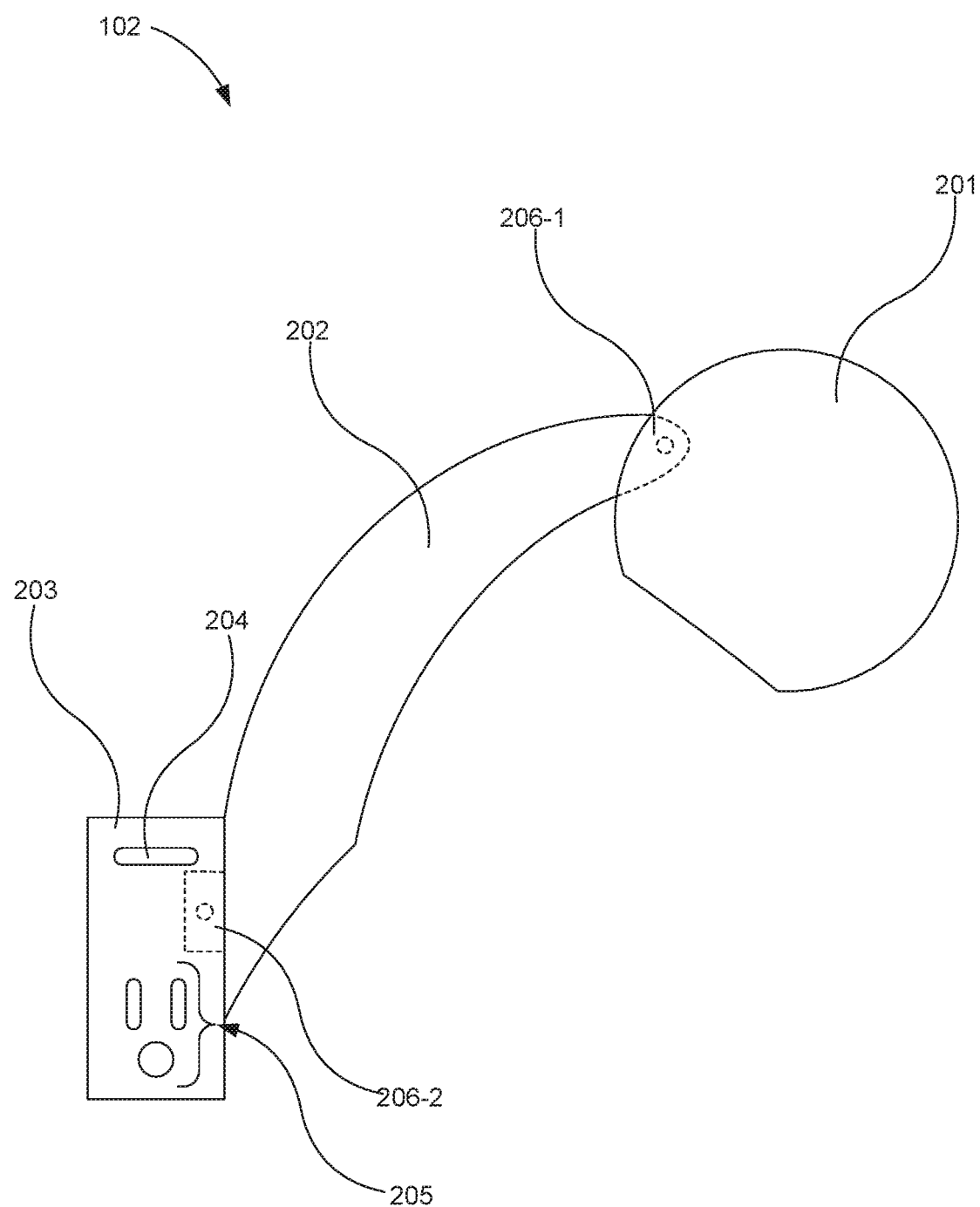
FIG. 2 is a side view of the imaging device of FIG. 1, according to one example of the principles described herein.

FIG. 2 is a side view of the imaging device (102) of FIG. 1, according to one example of the principles described herein. The imaging device (102) may include a gallery light form factor where the imaging device (102) includes a similar form factor as overhanging light fixtures found in art galleries. Although the examples of the imaging device (102) described herein include the gallery light form factor, the imaging device (102) may include any form factor. Further, although the imaging device (102) is depicted herein as being mounted above a display area (150) such as a passive whiteboard, the imaging device (102) may be mounted on the sides or below the display area (150) instead of or in addition to above the display area (150). In these configurations, the imaging device (102) may be used to enhance the display area (150) with new content, capture the evolution of the existing content, or perform a number of other functions described herein.

The imaging device (102) may include an imaging head (201), a support arm (202), and a wall mount (203). The head (201) includes a number of imaging elements as will be describe below. The support arm (202) supports the imaging head (201) relative to the wall mount (203). In one example, the support arm (202) includes articulating elements located at the ends thereof such as, for example, resistive hinges (206-1, 206-2). The articulating elements allow for the support arm (202) to move the imaging head (201) relative to the wall mount (203) in order to place the imaging head (201) at a desired distance from the wall on which the imaging device (102) is mounted, position the imaging head (201) at a desired angle relative to the display area (150), or combinations thereof.

The wall mount (203) may include a number of electrical connections including, for example, connectors for data telecommunication technologies, connectors for an electrical power source, or combinations thereof. For example, the connectors for data telecommunication technologies may include any wired or wireless telecommunication technologies such as optical fibers, copper wires, any wireless local area network (WLAN) communication devices, or combinations thereof.

These telecommunication technologies may use standards or protocols based on, for example, universal serial bus (USB) standards such as, for example, the USB 3.0 standard as depicted in the USB connector (204) in FIG. 2. In another example, the telecommunication technologies may use the Institute of Electrical and Electronics Engineers' (IEEE) 802.11 standards for wireless communications. In still another example, the telecommunication technologies may use the IEEE 802.3 (Ethernet) standards. Further, in still another example, the telecommunication technologies may use power-line communication (PLC) systems that carries data on a conductor that is also used simultaneously for AC electric power transmission as defined by, for example, the IEEE 1901 standards. In still another example, the telecommunication technologies may use the BLUETOOTH wireless communication standard as defined by the Bluetooth special interest group. Still another telecommunication technology that may be used includes IEEE 1394 standard (Firewire). These telecommunication technologies, other telecommunication technologies and standards, or combinations thereof may be used to transfer data from a single imaging device (102) to another computing device, between a plurality of imaging devices (102), among a plurality of separate imaging device systems that each include at least one imaging device (102), or combinations of these devices and systems. In one example, a user's desired data transfer speed may be taken into account when determining a telecommunication technology to use in the examples described herein.

The telecommunication technologies used by the wired or wireless communication channels include standards or protocols based on, for example, USB standards, IEEE 802.11 standards IEEE 802.3 (Ethernet) standards, IEEE 1901 standards, BLUETOOTH wireless communication standards, IEEE 1394 standard (Firewire), other telecommunication technologies and standards, or combinations thereof. In one example, a plurality of imaging devices (102) may be communicatively coupled to one another in parallel, in series such as a daisy chain configuration, or a combination thereof. For example, a plurality of imaging devices (102) may be daisy chained in parallel using wired communication channels that use both the IEEE 1394 standard (Firewire) and the USB3 standard.

As mentioned above, the wall mount (203) may include a number of connectors that provide an electrical power source, or a combination of connectors for data telecommunication technologies, connectors for an electrical power source. As depicted in FIG. 2, the wall mount (203) may include an AC electrical power socket (205). In another example, and as described above, the AC electrical power socket (205) may include a PLC system that carries data on a conductor that is also used simultaneously for AC electric power transmission as defined by the IEEE 1901 standards.

Figure 3:
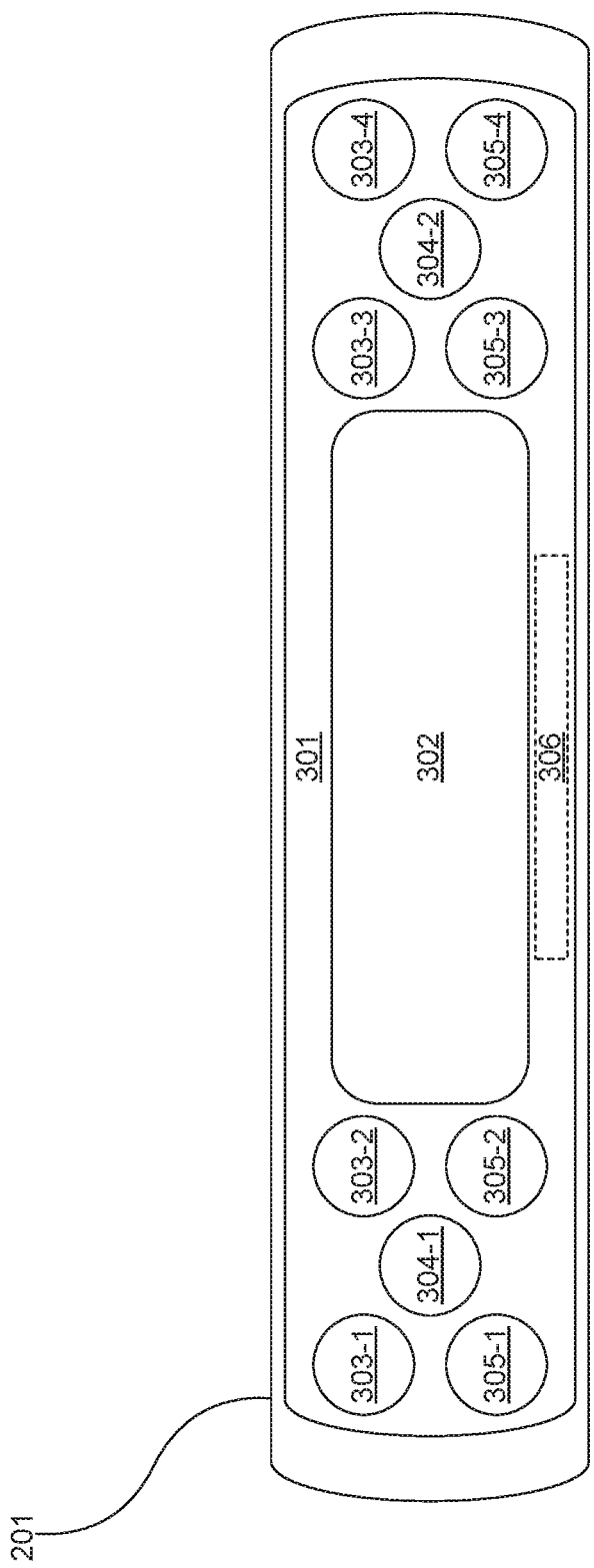
FIG. 3 is a view of an imaging head of the imaging device of FIG. 1, according to one example of the principles described herein.

FIG. 3 is a view of an imaging head (201) of the imaging device (102) of FIG. 1, according to one example of the principles described herein. The imaging head (201) of the imaging device (102) includes a device panel (301) that includes number of image projection and capture devices such as, for example, at least one image projector (302) to project an image onto the display area (150). In one example, the image projector (302) is any optical device that projects still or moving images onto the display area (150). In one example, the image projector (302) may be a digital light processing (DLP) system based on micro-electro-mechanical technology that uses digital micro-mirror devices.

In another example, the image projector (302) may be a pico projector that includes a light source including a number of light-emitting diode (LED) modules that emit, for example, red, green, and blue wavelengths of light. The light emitted from the LEDs may travel through a number of lenses including collimating lenses and magnification lenses, and a number of polarizing beam splitters (PBSs) to be projected onto the display area (150). In the examples described above, the image projector (302) may include a mirror onto which the projected image from the image projector (302) is reflected in order to obtain an enlargement of the projected image on the display area (150) and to provide the image projector (302) of the imaging device (102) a means by which the projected image may be targeted onto the surface of the display area (150).

The imaging head (201) may also include a number of image capture devices (303-1, 303-2, 303-3, 303-4, collectively referred to herein as 303) to capture at least one image of the display area (150). In one example, the of image capture devices (303) may include digital cameras. In one example, four image capture devices (303-1, 303-2, 303-3, 303-4) are included in the imaging head (201). In this example, two of the image capture devices (303) such as image capture devices 303-2 and 303-3 may be used as a first to capture images of the display area (150). Another pair of image capture devices (303) such as image capture devices 303-1 and 303-4 may be used to capture images the display area (150). In one example, the image capture devices (303) may use a number of charge-coupled device (CCD) digital image sensors, a number of complementary metal-oxide-semiconductor (CMOS) digital image sensors, or a combination thereof to capture images of the display area (150).

In one example, a number of the image capture devices (303) may be low-resolution image capture devices, while a number of the image capture devices (303) may be high-resolution image capture devices. In this example, the low-resolution image capture devices may be used to detect motion very quickly, and may be used in conjunction with a number of infrared sensors described below to detect a user's hand or other body part that appears in front of the display area (150). The high-resolution image capture devices in this example may be used to capture the information written on or otherwise displayed on the display area (150) to ensure that all the information is accurately captured.

Further, as mentioned above, the imaging head (201) may also include a number of sensors (305-1, 305-2, 305-3,305-4, collectively referred to herein as 305) to detect the presence of an object within the field of view of the image capture devices (303). In one example, the image capture devices (303) and the sensors (305) are the same devices. In this example, the combination of the image capture devices (303) and the sensors (305) perform at least the functions described herein as to both the image capture devices (303) and the sensors (305). Further, in one example, the sensors (305) are infrared sensors. In this example, the infrared sensors (305) are used to detect depth of an object relative to the imaging head (201) and the object's position relative to the display area (150). In this example, the infrared sensors (305) project infrared radiation and include an infrared camera to track the movement of objects in three dimensions. In one example, the infrared sensors (305) include an infrared laser projector combined with a monochrome CMOS sensor. The monochrome CMOS sensor captures video or still images in 3D.

Thus, throughout the examples described herein, specialized pen or stylus devices are not used in connection with the imaging devices (102) and the display area (150). As mentioned earlier, specialized hardware such as a specialized pen or stylus device are expensive, and are often left unused relative to their expense. The examples described herein greatly reduce the expense associated with an interactive whiteboard system by not requiring the purchase or use of such specialized hardware. The examples described herein may be retrofitted to a passive whiteboard without requiring the purchase of a specialized whiteboard or specialized pen or stylus devices.

In addition, as mentioned above, the image capture devices (303) may be used in conjunction with the sensors (305) in order to determine and capture depth of objects within the field of view of the image capture devices (303). The objects detected using the image capture devices (303) and the sensors (305) include, for example, body parts of a number of users such as fingers, hands, arms and faces, and marking or pointing devices such as markers and styluses, among other objects used in connection with the a display area (150) such as a whiteboard.

The imaging head (201) may also include a number of illumination sources (304-1, 304-2, collectively referred to herein as 304). The illumination sources (304) may be used to illuminate a portion of the display area (150). For example, if the ambient light within a room in which the display area (150) is located is low, the illumination sources (304) may be used to illuminate the display area (150) in order to allow a user and an audience to see the whiteboard at a desired level of illumination. Further, if the image capture devices (303) and the sensors (305) require a higher level of illumination of the display area (150) in order to capture images of the display area (150) and the area surrounding the display area (150), then the illumination sources (304) may be used to illuminate the display area (150) and the surrounding area. Still further, the illumination provided by the illumination sources (304) may be adjusted in order to allow for information projected onto the display area (150) by the image projector (302) to be seen by a user.

In one example, the illumination level provided by the illumination sources (304) may be adjusted automatically based on a measurement of ambient illumination relative to the imaging devices (102) and the display area (150). In this example, if the ambient illumination reaches above or below a user-selected range, the imaging devices (102) may adjust the illumination output by the illumination sources (304). Thus, the imaging devices (102) may further include a light metering device to detect the ambient levels of illumination, and signal to the imaging devices (102) to raise or lower the illumination output by their respective illumination sources (304).

Figure 5:
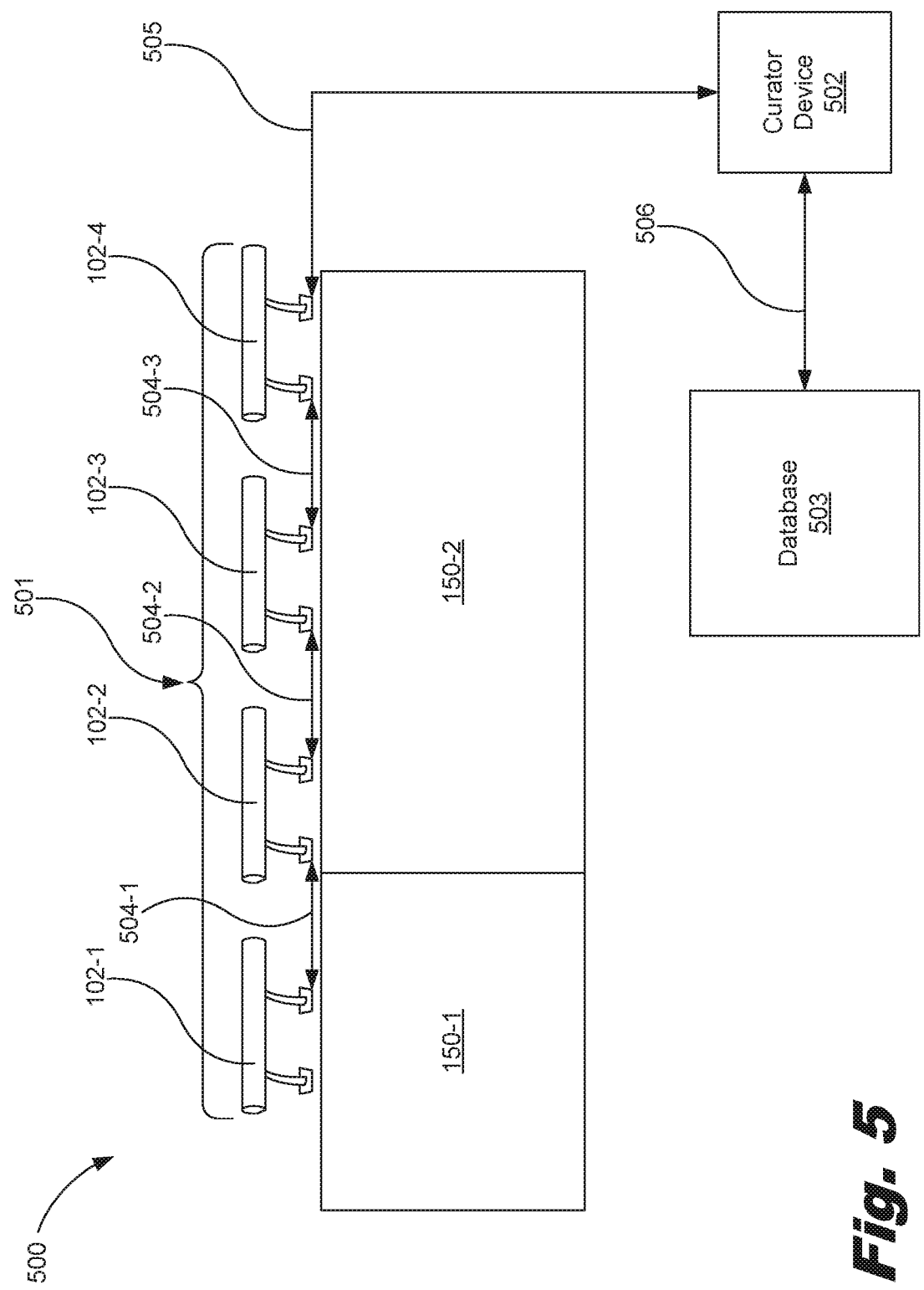
FIG. 5 is a diagram of an interactive display system including an array of imaging devices mounted adjacent to a plurality of display areas, according to one example of the principles described herein.

The imaging head (201) of the imaging device (102) may further include a network adaptor (306) to provide network connectivity and data transfer between an array of imaging devices (102) and other computing devices such as a curator device (FIG. 5, 502). In one example, the imaging devices (102) described herein may include limited processing resources. In this example, the imaging devices (102) function as data capturing and data projecting devices through their respective image capture devices (303) and sensors (305), and the image projectors (302), respectively. In this example, the imaging devices (102) may include enough processing resources such as the network adaptor (306) to provide data transfer to other computing devices, but may leave processing of the data to, for example, the curator device (FIG. 5, 502).

Figure 4:
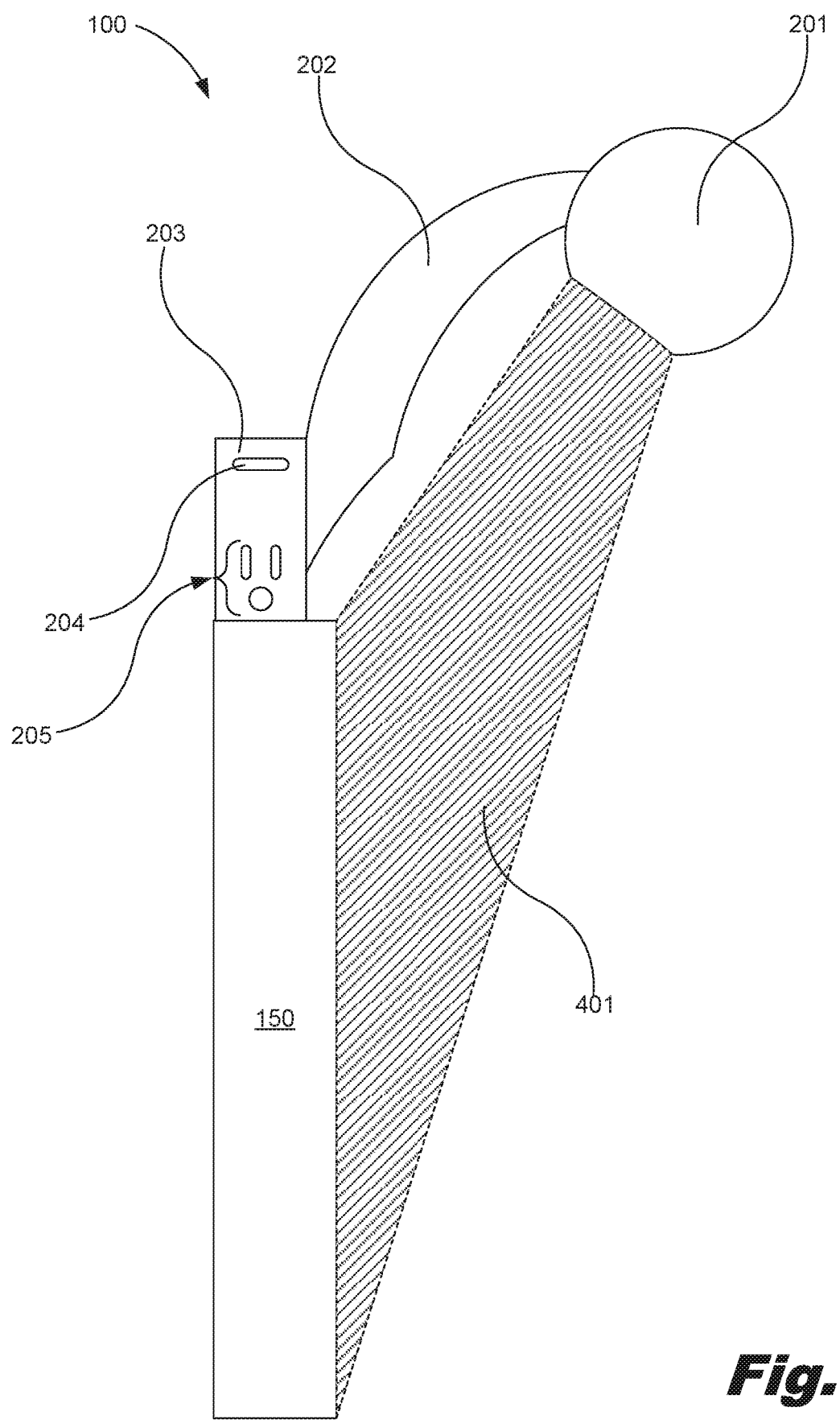
FIG. 4 is a side view of the imaging device of FIG. 1 mounted adjacent to a display area, according to one example of the principles described herein.

FIG. 4 is a side view of the imaging device (102) of FIG. 1 mounted adjacent to a display area (150), according to one example of the principles described herein. As depicted in FIG. 4, the capture area (401) of an imaging device (102) is depicted. As depicted in FIG. 4, the imaging device (102) is situated relative to the display area (150) in a curved forward form factor that allows the imaging device (102) to capture and project images down onto the display area (102) at an angle. This layout of the imaging device (102) relative to the display area (102) allows the imaging devices (102) to capture and project images onto the display area (150) without impeding usage of the display area (102), or occluding images projected by the imaging device (102). This may be contrasted with a projection system that is projecting from behind the user. In this example, the user occludes portions of the surface on which the projection system projects by simply standing in front of the projected image.

The resistive hinges (206-1, 206-2) depicted in FIG. 2 may be used to adjust the capture area (401) by moving the imaging head (201) and support arm (202) to different positions and cause the imaging head (201) to have a different perspective. In this manner, the imaging device (102) may be adjusted so that the entire height of the display area (150) is viewable by the imaging head (201) and so that the imaging head (201) is able to digitally capture images from the entirety of the display area (150) and project images onto the entirety of the display area (150).

In one example, each imaging device (102) used in conjunction with the display area (150) may be calibrated in order to ensure that the imaging devices (102) properly capture images from the display area (150) and project images onto the display area (150). In one example, calibration of the imaging devices (102) relative to the display area (150) may be performed using a projection of horizontal and vertical lines onto the display area (150) using the image projectors (302) of each of the imaging devices (102). The calibration process may be performed initially after install or set-up of the imaging devices (102), after each startup of the imaging devices (102), on a continuous basis, at other times, or combinations thereof.

In one example, the imaging devices (102) may detect a change in surfaces between the display area (150) and the surrounding environment such as a frame around the display area (150) or a wall on which the display area (150) is located. In this example, the imaging devices (102) use the detection of the change in surfaces to identify a boundary of the display area (150) to ensure that the entire display area (150) is used by the imaging devices (102). In another example, a user may be directed to point to edges of the display area (150), and the imaging devices (102) detect those gestures to outline the edge of the display area (150).

FIG. 5 is a diagram of an interactive display system (500) including an array (501) of imaging devices (102-1, 102-2, 102-3, 102-4, collectively referred to herein as 102) mounted adjacent to a plurality of display areas (150-1, 150-2, collectively referred to herein as 150), according to one example of the principles described herein. The interactive display system (500) may be utilized in any data processing scenario including, stand-alone hardware, mobile applications, through a computing network, or combinations thereof. Further, the interactive display system (500) may be used in a computing network, a public cloud network, a private cloud network, a hybrid cloud network, other forms of networks, or combinations thereof. In one example, the methods provided by the interactive display system (500) are provided as a service over a network by, for example, a third party. In this example, the service may include, for example, the following: a Software as a Service (SaaS) hosting a number of applications; a Platform as a Service (PaaS) hosting a computing platform including, for example, operating systems, hardware, and storage, among others; an Infrastructure as a Service (IaaS) hosting equipment such as, for example, servers, storage components, network, and components, among others; application program interface (API) as a service (APIaaS), other forms of network services, or combinations thereof. The present systems may be implemented on one or multiple hardware platforms, in which the modules in the system can be executed on one or across multiple platforms. Such modules can run on various forms of cloud technologies and hybrid cloud technologies or offered as a SaaS (Software as a service) that can be implemented on or off the cloud. In another example, the methods provided by the interactive display system (500) are executed by a local administrator.

The interactive display system (500), as depicted in FIG. 5, includes four separate imaging devices (102). However, any number of imaging devices (102) may be used within the interactive display system (500). The imaging devices (102) may be communicatively coupled to one another and either directly or indirectly to a curator device (502) using a number of wired or wireless communication channels (504-1, 504-2, 504-3, 505). As described above, the telecommunication technologies used by the wired or wireless communication channels (504-1, 504-2, 504-3, 505) include standards or protocols based on, for example, USB standards IEEE 802.11 standards IEEE 802.3 (Ethernet) standards, IEEE 1901 standards, BLUETOOTH wireless communication standards, IEEE 1394 standard (Firewire), other telecommunication technologies and standards, or combinations thereof. In one example, the imaging devices (102) may be communicatively coupled to one another in parallel, in series such as a daisy chain configuration, or a combination thereof. The provision of electrical power to each of the imaging devices (102) may be achieved in a similar manner in which electrical power is delivered among the imaging devices (102) in parallel, in series such as a daisy chain configuration, or a combination thereof. In one example, a PLC system that carries data on a conductor that is also used simultaneously for AC electric power transmission as defined by, for example, the IEEE 1901 standards may be used to simultaneously transmit data and power among, to and from the imaging devices (102).

FIG. 5 depicts a plurality of display areas (150-1, 150-2, collectively referred to herein as 150) within the interactive display system (500). Although two display areas (150) are depicted in FIG. 5, any number of display areas (150) may be used within a single interactive display system (500). In the example of FIG. 5, the first display area (150-1) is relatively smaller than the second display area (150-2). Further, a single imaging device (102-1) is associated with the first display area (150-1), and a plurality of imaging devices (102-2, 102-3, 102-4) are associated with the second display area (150-2). However, any arrangement of imaging devices (102) relative to the plurality of display areas (150) may be used within the interactive display system (500).

In one example, the imaging devices (102) are positioned relative to the display areas (150) such that their respective capture areas (401) overlap one another. In this manner, all information written or displayed on the display areas (150) will be captured by the imaging devices (102) without missing information between capture areas (401) of the imaging devices (102) or gaps between capture areas (401). In one example, once images have been captured by the image capture devices (303) and/or sensors (305) of the imaging devices (102) or once images are projected by the image projectors (302) of the imaging devices (102), a stitching process may be performed to cause the captured or projected images to form a single image. In the case of stitching a number of images captured by the image capture devices (303) and/or sensors (305) of the imaging devices (102), the stitching process may be performed by the curator device (502) after data representing the images captured are transferred to the curator device (502) from the image capture devices (303) and/or sensors (305). A stitched image may be displayed to a user on a display device of the curator device (502) as will be described in more detail below.

In the case of a stitching an image projected by the image projectors (302) of the imaging devices (102) on the display area (150), the curator device (502) may divide an image into sections that are to be rendered by the image projectors (302). In this case, the stitching is performed by dividing the image into the sections and stitching the sections together using the image projectors (302) to form a complete image on the display area (150). The stitching process performed by the image projectors (302) may, in one example, be performed using image projectors (302) of imaging devices (102) such as imaging device (102-1) that are not associated with a common display area (150) as a number of other imaging devices (102) such as imaging devices (102-2, 102-3, 102-4). In this example, a portion of the image to be displayed may be displayed on display area (150-1) using imaging device (102-1) as well as display area (150-2) using imaging devices (102-2, 102-3, 102-4).

As mentioned above, the curator device (502) may receive and send data representing images captured from and projected on the display areas (150) of the interactive display system (500). The curator device (502) also processes image data going to and received from the imaging devices (102). More details regarding the curator device (502) will be described below.

In one example, a database (503) or other data storage device may be located in the same network as the curator device (502) and coupled to the curator device (502) via a network connection (506). In one example, the database (503) may be in the same local area network (LAN) as the curator device (502). In another example, the database (503) may be outside the LAN of the curator device (502). In these examples, the data stored on the database (503) is restorable to the interactive display system (500) of FIG. 5 or may be presented simultaneously or non-simultaneously on a different interactive display system (500).

The ability to store data presented on the interactive display system (500) also allows a user to switch from one interactive display system (500) to another. In some situations, an interactive display system (500) may be located within a conference room of a building, and the current user may be required to leave that particular conference room due to another group of users who had scheduled that room or otherwise need to use the room. The user may be pushed out of that room and be required to either wait for the room to be vacated by the group of users, or move to another room. The database (503) in this situation, allows the user to store the data presented on the interactive display system (500), and either wait until the interactive display system (500) in the room becomes available again, or move to another room with another interactive display system (500). The data the user presented on the interactive display system (500) may be restored to the interactive display system (500) or another interactive display system (500) without losing information previously presented.

The above situation is exemplary of what may occur while using the interactive display system (500). However, in another situation, the user may wish to revisit a collaborative discussion held previously in order to finish the collaboration, add to the previous discussion, or refresh his or her memory regarding the previous collaborative meeting. In this situation, the data captured from the interactive display system (500) representing the previous collaborative meeting may be restored to the interactive display system (500).

Figure 6:
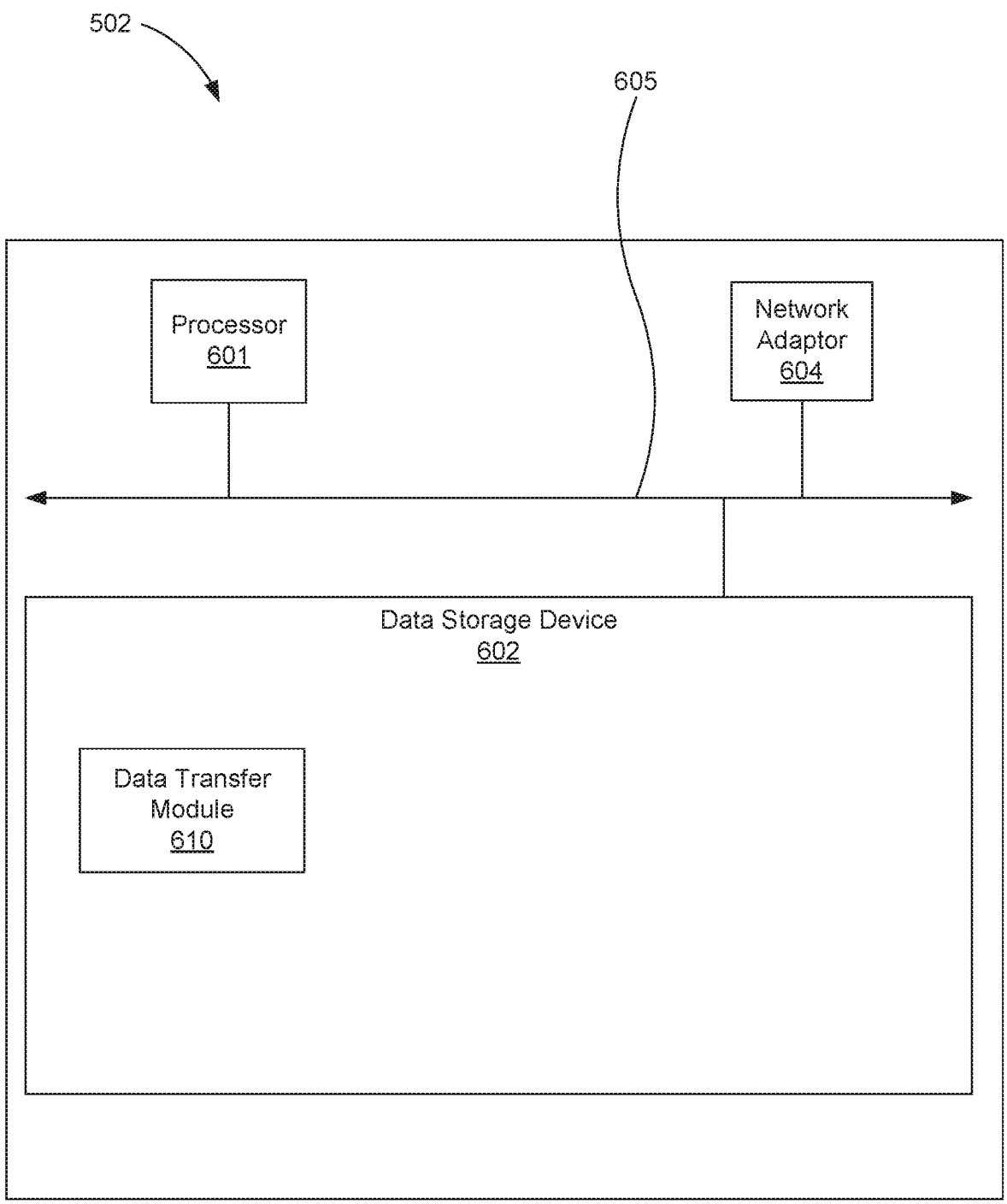
FIG. 6 is a block diagram of a curator device of the interactive display system of FIG. 5, according to one example of the principles described herein.

The curator device (502) will now be described in more detail. FIG. 6 is a block diagram of a curator device (502) of the interactive display system (500) of FIG. 5, according to one example of the principles described herein. In one example, the imaging devices (102) do not include processing devices so that their role is data projection and capture. In an example described above, the imaging devices (102) may include limited processing resources sufficient to capture and project data, and transfer that data to and receive data from the curator device (502). In this example, the imaging devices (102) function as data capturing and data projecting devices through their respective image capture devices (303) and sensors (305), and the image projectors (302), respectively. Further, in this example, the imaging devices (102) may include enough processing resources such as the network adaptor (FIG. 3, 306) to provide data transfer to other computing devices, but may leave processing of the data to, for example, the curator device (FIG. 5, 502).

To achieve its desired functionality, the curator device (502) includes various hardware components. Among these hardware components may be a number of processors (601), a number of data storage devices (602), and a number of network adapters (604). These hardware components may be interconnected through the use of a number of busses and/or network connections. In one example, the processor (601), data storage device (602), and the network adapter (604) may be communicatively coupled via a bus (605).

The processor (601) may include the hardware architecture to retrieve executable code from the data storage device (602) and execute the executable code. The executable code may, when executed by the processor (601), cause the processor (601) to implement at least the functionality of processing of captured images, processing of projected images, image stitching, and other functions, according to the methods of the present specification described herein. In the course of executing code, the processor (601) may receive input from and provide output to a number of the remaining hardware units.

The data storage device (602) may store data such as executable program code that is executed by the processor (601) or other processing device. As will be discussed, the data storage device (602) may specifically store computer code representing a number of applications that the processor (601) executes to implement at least the functionality described herein.

Figure 7:
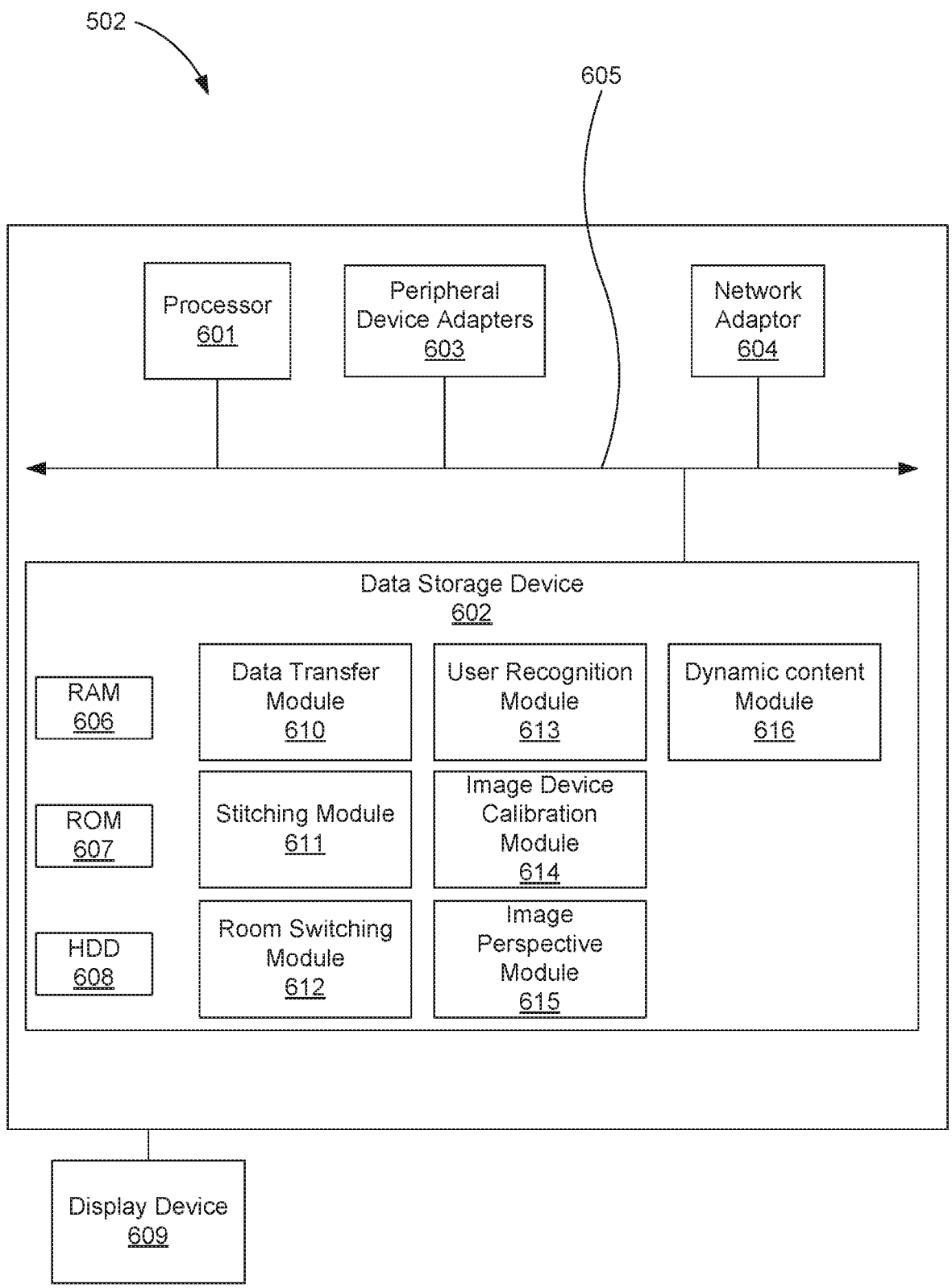
FIG. 7 is a block diagram of a curator device of the interactive display system of FIG. 5, according to another example of the principles described herein.

The data storage device (602) may include various types of memory modules, including volatile and nonvolatile memory. For example, the data storage device (602) of the present example includes Random Access Memory (RAM) (FIG. 7, 606), Read Only Memory (ROM) (FIG. 7, 607), and Hard Disk Drive (HDD) memory (FIG. 7, 608). Many other types of memory may also be utilized, and the present specification contemplates the use of many varying type(s) of memory in the data storage device (602) as may suit a particular application of the principles described herein. In certain examples, different types of memory in the data storage device (602) may be used for different data storage needs. For example, in certain examples the processor (601) may boot from Read Only Memory (ROM) (FIG. 7, 607), maintain nonvolatile storage in the Hard Disk Drive (HDD) memory (FIG. 7, 608), and execute program code stored in Random Access Memory (RAM) (FIG. 7, 606).

The data storage device (602) may include a computer readable medium, a computer readable storage medium, or a non-transitory computer readable medium, among others. For example, the data storage device (602) may be, but not limited to, an electronic, magnetic, optical, electromagnetic, infrared, or semiconductor system, apparatus, or device, or any suitable combination of the foregoing. More specific examples of the computer readable storage medium may include, for example, the following: an electrical connection having a number of wires, a portable computer diskette, a hard disk, a random access memory (RAM), a read-only memory (ROM), an erasable programmable read-only memory (EPROM or Flash memory), a portable compact disc read-only memory (CD-ROM), an optical storage device, a magnetic storage device, or any suitable combination of the foregoing. In the context of this document, a computer readable storage medium may be any tangible medium that can contain, or store computer usable program code for use by or in connection with an instruction execution system, apparatus, or device. In another example, a computer readable storage medium may be any non-transitory medium that can contain, or store a program for use by or in connection with an instruction execution system, apparatus, or device.

The network adaptor (104) in the curator device (502) enables the processor (601) to interface with various other hardware elements, external and internal to the curator device (502). For example, the network adaptor (604) allows the curator device (502) to send and receive data to and from the imaging devices (102). The network adapter (604) may provide an interface to other computing devices within, for example, a network, thereby enabling the transmission of data between the curator device (500) and other devices located within the network.

The curator device (502) further includes a number of modules used in the implementation of processing of captured images, processing of projected images, image stitching, and other functions. The various modules within the curator device (502) include executable program code that may be executed separately. In this example, the various modules may be stored as separate computer program products. In another example, the various modules within the curator device (502) may be combined within a number of computer program products; each computer program product including a number of the modules.

In the example of FIG. 6, the curator device (502) may include a data transfer module (610) to, when executed by the processor (601), send and receive data to and from the imaging devices (102) and provide instructions to the various elements of the imaging devices (102) to project or capture the transferred data. Thus, the data transfer module (610), when executed by the processor (601), provides data and instructions to the imaging devices (102) so that the imaging devices (102) may perform their functions described herein.

FIG. 7 is a block diagram of a curator device (502) of the interactive display system (500) of FIG. 5, according to another example of the principles described herein. Elements numbered identically with respect to FIG. 6 indicate similar elements within FIG. 7. The example of FIG. 7 further includes peripheral device adapters (603). The peripheral device adapters (603) provide an interface to input/output devices, such as, for example, the display device (609), a mouse, or a keyboard. The peripheral device adapters (603) may also provide access to other external devices such as an external storage device such as the database (FIG. 5, 503), a number of network devices such as, for example, servers, switches, and routers, client devices, other types of computing devices, and combinations thereof.

The display device (609) may be provided to allow a user of the curator device (502) to interact with and implement the functionality of the curator device (502). The peripheral device adapters (603) may also create an interface between the processor (601) and the display device (609), a printer, or other media output devices. The curator device (500) may, when executed by the processor (601), display the number of graphical user interfaces (GUIs) on the display device (609) associated with the executable program code representing the number of applications stored on the data storage device (602). The GUIs may include aspects of the executable code including executable code that displays data captured from and projected onto the display areas (150). Additionally, via making a number of interactive gestures on the GUIs of the display device (109), a user may, through the use of the curator device (502), instruct the imaging devices (102) to project data onto the display areas (150) and capture images of information displayed on the display areas (150). Examples of display devices (609) include a computer screen, a laptop screen, a mobile device screen, a personal digital assistant (FDA) screen, and a tablet screen, among other display devices (606).

In addition to the data transfer module (610) described above, the curator device (502) may include a number of additional modules. For example, the curator device (502) may include a stitching module (611) to, when executed by the processor (101), cause the captured or projected images to form a single image. The stitching module (611) acts as a data synchronization device by time coding the captured still and video images to preserve evolution of the markings on the display area (150).

Specifically, the stitching module (611), in the case of stitching a number of images captured by the image capture devices (303) and/or sensors (305) of the imaging devices (102), receives data representing the images captured, and combines the plurality of captured images with overlapping fields of view to produce a segmented high-resolution image. In one example, the stitching module (611) may stitch captured still images as well as captured video images.

Further, the stitching module (611), in the case of stitching a an image projected by the image projectors (302) of the imaging devices (102) on the display area (150), divides an image stored, for example, on the data storage device (602), into sections that are to be rendered by the image projectors (302). In this case, the stitching module (611) divides the image into the sections and stitches the sections together using the image projectors (302) to form a complete image on the display area (150). The stitching process performed by the image projectors (302) may, in one example, be performed using image projectors (302) of imaging devices (102) such as imaging device (102-1) that are not associated with a common display area (150) as a number of other imaging devices (102) such as imaging devices (102-2, 102-3, 102-4). In this example, a portion of the image to be displayed may be displayed on display area (150-1) using imaging device (102-1) as well as display area (150-2) using imaging devices (102-2, 102-3, 102-4). In one example, the stitching module (611) may stitch projected still images as well as projected video images. Further, in one example, a stitched image may be displayed to a user on the display device (609) of the curator device (502) to allow a user to confirm what images are captured or projected. Further, in the case of stitching video images, the stitching module (611) may synchronize video content captured by the plurality of imaging devices (102).

The curator device (502) may further include a room switching module (612) to, when executed by the processor (101), allow for the transmission of data captured and projected on a first interactive display system (500) to another. The room switching module (612), when executed by the processor (601) of the curator device (502), saves room data defining information projected onto and captured from the first display area(s) (150) of a first interactive display system (500), and stores the room data on, for example, the data storage device (602) of the curator device (502) and/or the database (FIG. 5, 503). The room data may then be restored to the first interactive display system (500) or another interactive display system (500). As described above, this allows a user to switch physical rooms within a building if necessary, or revisit a previous collaboration meeting and refresh his or her recollection of the topics discussed during the collaborative meeting.

The curator device (502) may further include a user recognition module (613) to, when executed by the processor (101), allow for the sensors (FIG. 3, 305) to identify a first user relative to other users of the interactive display system (500). The user recognition module (613), when executed by the processor (601) of the curator device (502), detects body parts of a number of users such as fingers, hands, arms, and faces. Upon detection of these body parts, the user recognition module (613) may use finger print identification processes, facial recognition processes, or other user identification processes to identify the first user relative to the other users. In one example, the user recognition module (613) may be used as security device to allow access to and use of the interactive display system (500) for authorized individuals, while restricting or denying access and use of the interactive display system (500) to unauthorized individuals.

The curator device (502) may further include an image device calibration module (614) to, when executed by the processor (101), calibrate a number of imaging devices (102) within an interactive display system (500). The image device calibration module (614), when executed by the processor (601) of the curator device (502), may calibrate the imaging devices (102) in order to ensure that the imaging devices (102) properly capture images from the display area (150) and project images onto the display area (150). As described above, calibration of the imaging devices (102) relative to the display area (150) may be performed by the image device calibration module (614) instructing the imaging devices (102) to project of horizontal and vertical lines onto the display area (150) using the image projectors (302) of each of the imaging devices (102). The calibration process may be performed initially after install or set-up of the imaging devices (102), after each startup of the imaging devices (102), or on a continuous basis.

In one example, the image device calibration module (614) may instruct the imaging devices (102) to detect a change in surfaces between the display area (150) and the surrounding environment such as a frame around the display area (150) or a wall on which the display area (150) is located. In this example, the image device calibration module (614) instructing uses the imaging devices (102) to detect the change in surfaces to identify a boundary of the display area (150). This ensures that the entire display area (150) is used by the imaging devices (102). In another example, a user may be directed to point to edges of the display area (150), and the image device calibration module (614) may use the imaging devices (102) to detect those gestures to outline the edge of the display area (150).

The curator device (502) may further include an image perspective module (615) to, when executed by the processor (101), adjust images captured from or projected onto the display area (150) due to the perspective of the imaging devices (102) with respect to the display areas (150). The image perspective module (615), when executed by the processor (601) of the curator device (502), may account for the perspective from which the imaging devices (102) individually and as an array capture and project images from and onto the display areas (150).

Figure 8A:
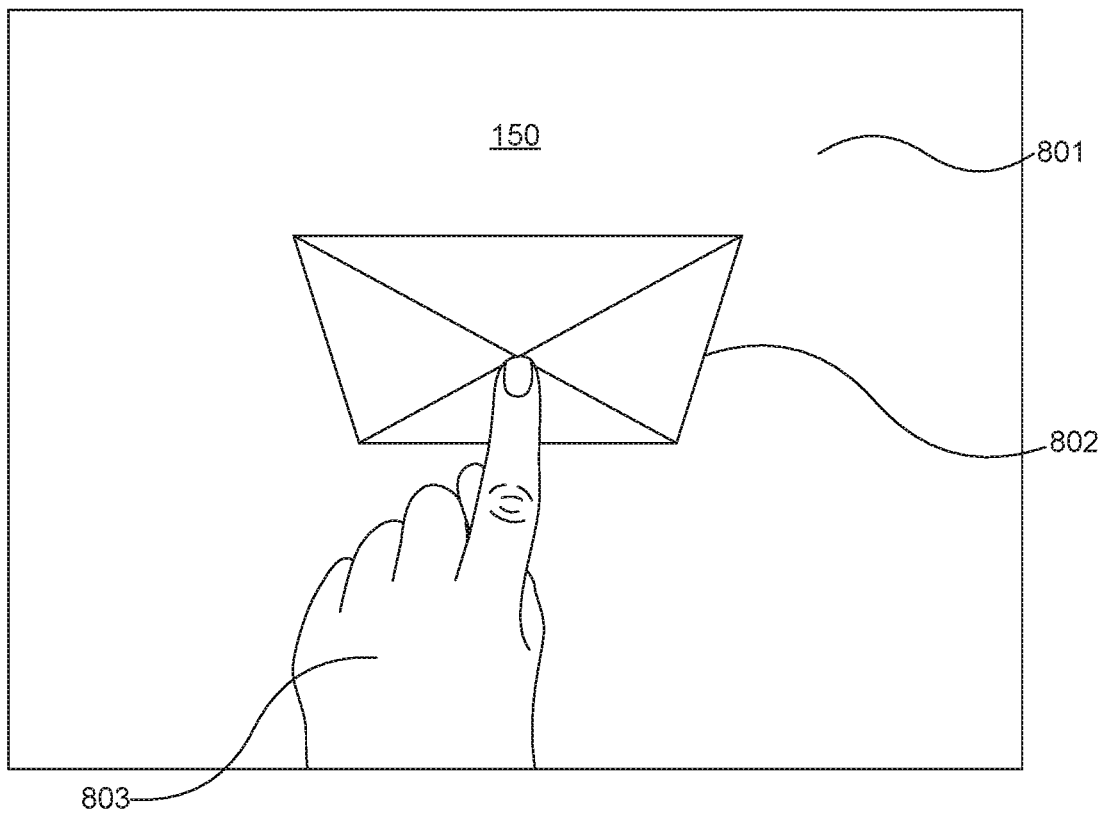
FIG. 8A is a diagram of an image captured by the imaging devices of FIGS. 1 through 5 depicting a shape drawn on the display area and distortion of the shape due to the positioning of the imaging device relative to the display area, according to one example of the principles described herein.
Figure 8B:
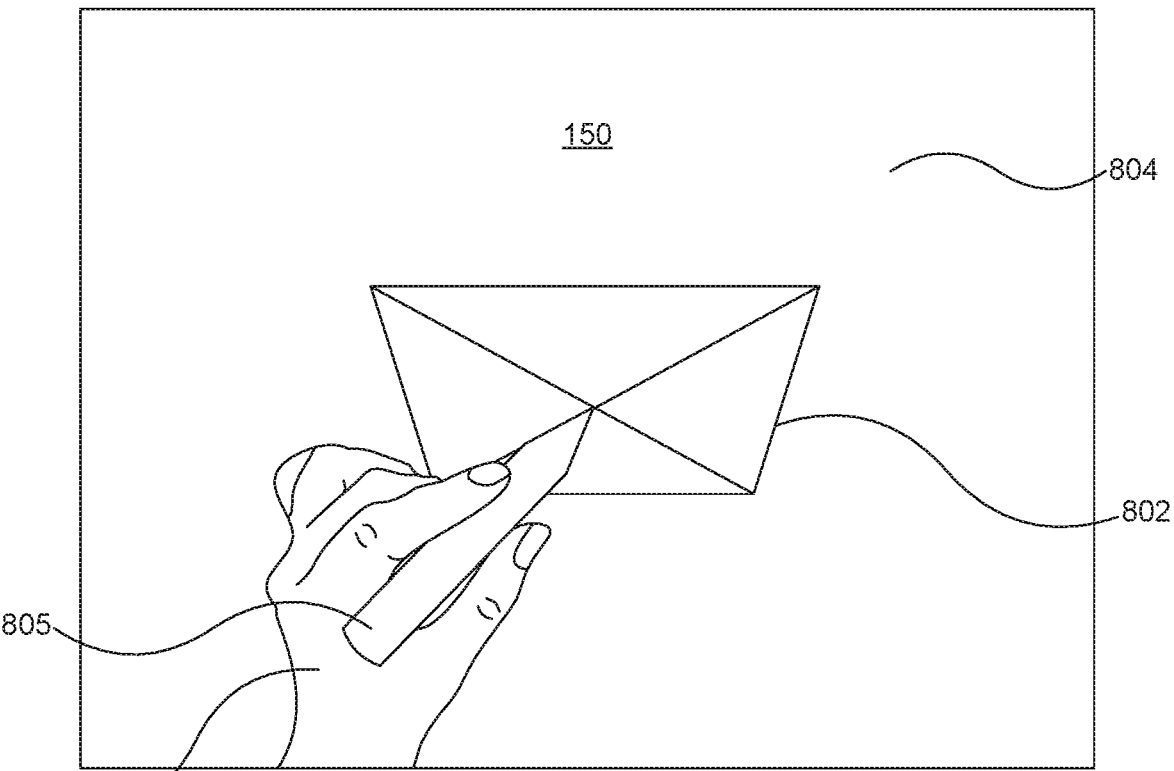
FIG. 8B is a diagram of an image captured by the imaging devices of FIGS. 1 through 5 depicting a shape drawn on the display area and distortion of the shape due to the positioning of the imaging device relative to the display area, according to another example of the principles described herein.

For example, FIG. 8A is a diagram of an image (801) captured by the imaging devices (102) of FIGS. 1 through 5 depicting a shape (802) drawn on the display area (150) and distortion of the shape (802) due to the positioning of the imaging device (102) relative to the display area (150), according to one example of the principles described herein. FIG. 8B is a diagram of an image (804) captured by the imaging devices (102) of FIGS. 1 through 5 depicting a shape (802) drawn on the display area (150) and distortion of the shape (802) due to the positioning of the imaging device (102) relative to the display area (150), according to another example of the principles described herein. FIGS. 8A and 8B depict a user's hand (803), and, in the case of FIG. 8B, a user's hand (803) holding a marking device (805) such as a dry-erase marker.

In FIGS. 8A and 8B, the perspective of the imaging device (102) that captured the images (801, 804) is above the display area (150) as similarly depicted in FIG. 1. From this perspective, the shape (802) is distorted, and what was originally drawn as an approximately square shape with lines drawn from opposite corners and intersecting in the middle, instead appears as an approximately trapezoidal shape with lines drawn from opposite corners and intersecting in the middle but with clearly different angles relative to the outer lines of the shape (802). The image perspective module (615) takes into account the perspective of the imaging devices (102) when storing data related to information written on the display area (150).

In one example, the image perspective module (615) accounts for the perspective of the imaging devices (102), and adjusts captured images and images projected onto the display area (150) to compensate for the distortion due to the perspective of the imaging devices (102). Data representing the compensated captured images may be stored in, for example, the data storage device (602) of the curator device (502), and/or the database (503). The data representing the compensated captured images may then be displayed on a separate display system such as the display device (FIG. 7, 609) of the curator device (502) or another display device that presents information from a non-distorted perspective.

Further, the image perspective module (615) accounts for the perspective of the imaging devices (102) when the images are to be projected onto the display area (150). In many cases, data a user wishes to present on a display area (150) may be originally presented as if the information was obtained or created from a non-distorted perspective. In this example, the perspective module (615) accounts for the perspective of the imaging devices (102), and prepares the information for projection via the image projectors (302) of the display devices (102).

The curator device (502) may further include a dynamic content module (616) to, when executed by the processor (601), analyzed captured images from the image capture devices (303) and/or the sensors (305) to determine if additional content may be displayed relative to the information captured in the images, and augment the information with dynamic content or augmented reality content. The dynamic content module (616), when executed by the processor (601) of the curator device (502), may, for example, take a written universal resource locator (URL) or other Internet-related identifier, and project information from that URL on the display area (150). The information may include, for example, the webpage represented by the URL.

In another example, the user may draw an image on the display area (150), and the dynamic content module (616)

may recognize the drawn image as an image that may be augmented by content from another source. In this example, if the user draws a trademark, for example, on the display area (150), the dynamic content module (616) may instruct the imaging devices (102) to project additional information such as a webpage containing more information regarding the goods or services represented by the trademark. A myriad of dynamic content and augment reality scenarios may be realized through the use of the dynamic content module (616).

Figure 9A:
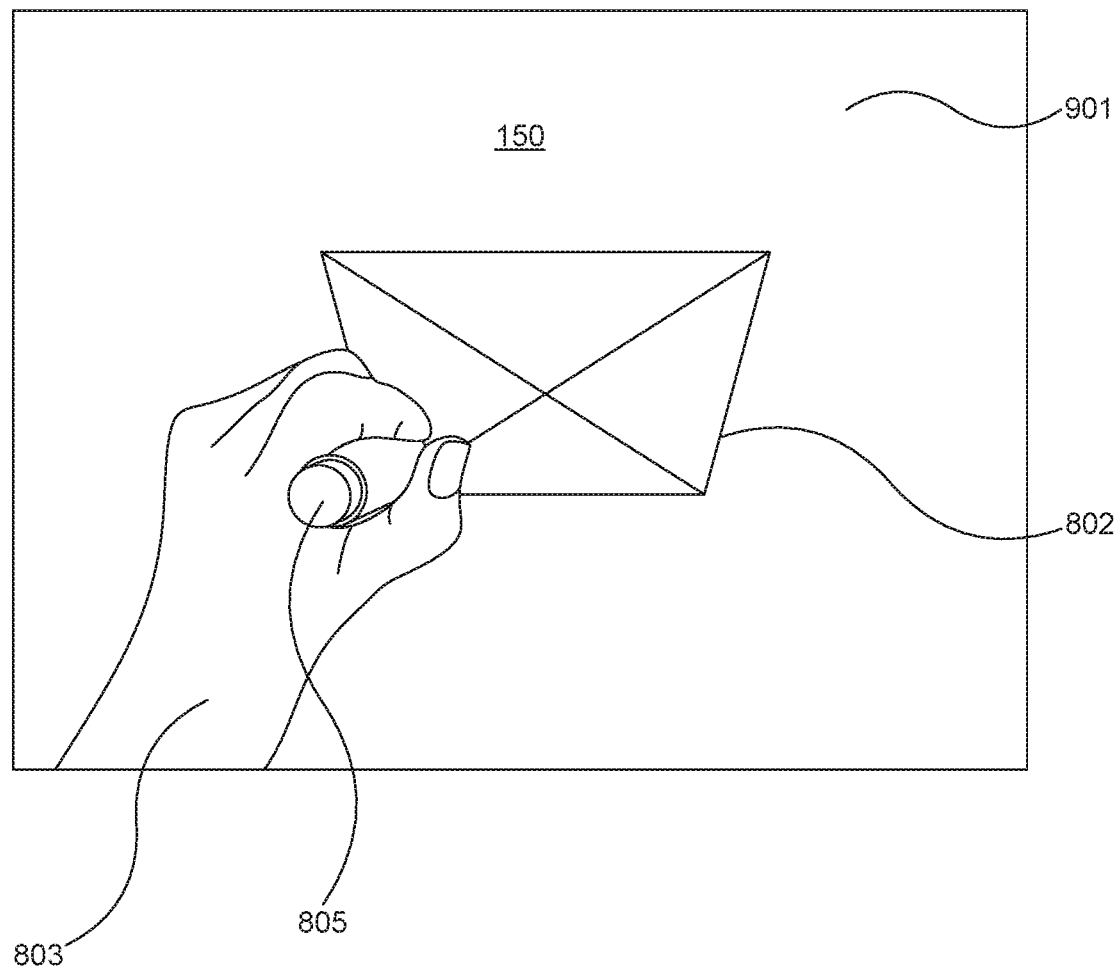
FIG. 9A is a diagram of an image captured by the imaging devices of FIGS. 1 through 5 depicting a shape drawn on the display area from a first perspective of a first imaging device within an array of imaging devices, according to one example of the principles described herein.
Figure 9B:
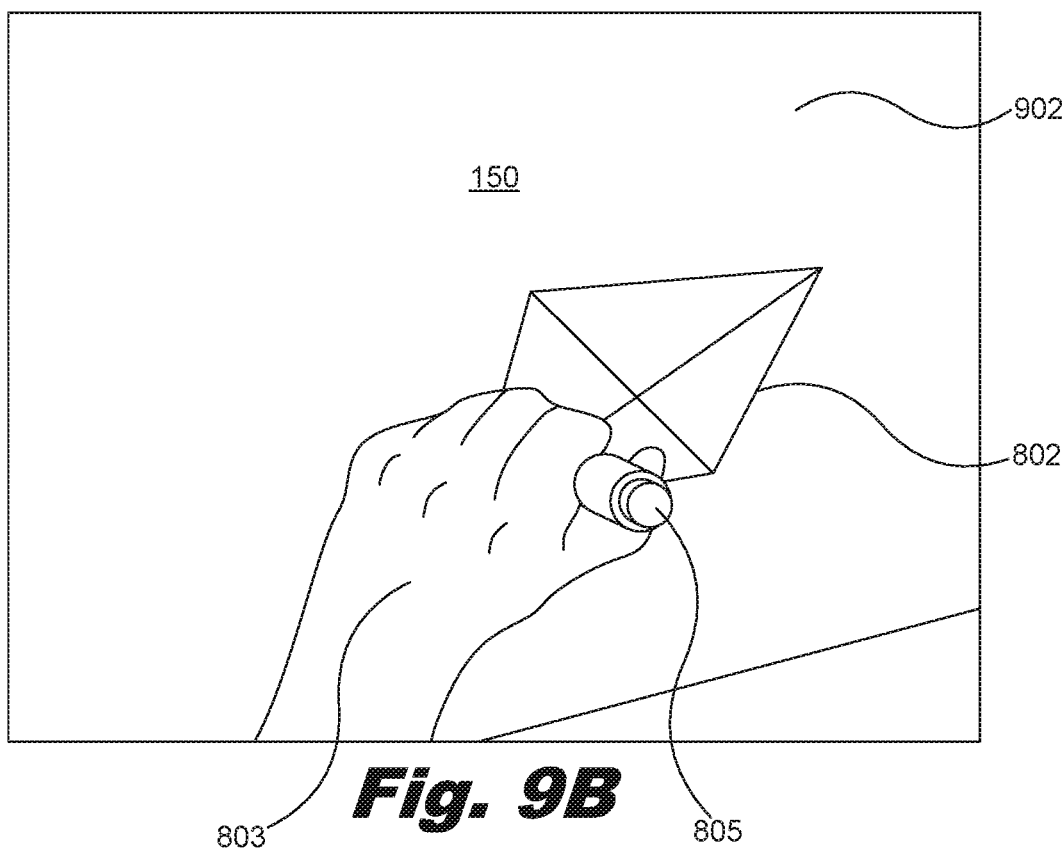
FIG. 9B is a diagram of an image captured by the imaging devices of FIGS. 1 through 5 depicting a shape drawn on the display area from a second perspective of a second imaging device within the array of imaging devices, according to one example of the principles described herein.

Turning again the figures, FIG. 9A is a diagram of an image (901) captured by the imaging devices (102) of FIGS. 1 through 5 depicting a shape (802) drawn on the display area (150) from a first perspective of a first imaging device (102) within an array (FIG. 5, 501) of imaging devices (102), according to one example of the principles described herein. FIG. 9B is a diagram of an image (902) captured by the imaging devices (102) of FIGS. 1 through 5 depicting a shape (802) drawn on the display area (150) from a second perspective of a second imaging device (102) within the array (FIG. 5, 501) of imaging devices (102), according to one example of the principles described herein. FIG. 9O is a diagram of an image (903) captured by the imaging devices (102) of FIGS. 1 through 5 depicting a shape (802) drawn on the display area (150) from a third perspective of a third imaging device (102) within the array (FIG. 5, 501) of imaging devices (102), according to one example of the principles described herein. The different perspectives depicted in FIGS. 9A through 9C will now be described in connection with FIG. 10. FIG. 10 is a flowchart (1000) showing an image stitching process using the curator device of FIG. 5, according to one example of the principles described herein. The process (1000) may begin by detecting (block 1001) a number of markings on a surface of the display area (150) such as the shape (802). This may be performed using, for example, the image capture devices (303) and/or sensors (305) of the imaging devices (102), the data transfer module (610) of the curator device (502), and other elements of the interactive display system (500).

Figure 9C:
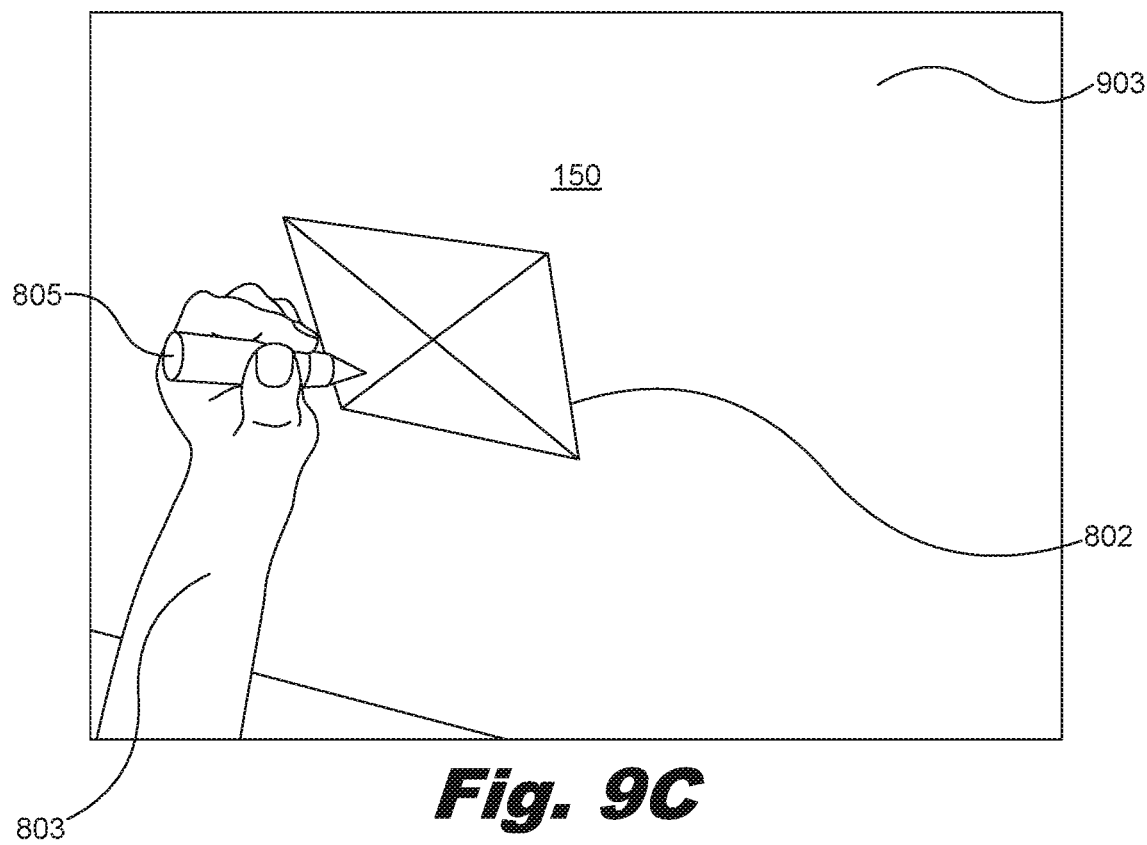
FIG. 9C is a diagram of an image captured by the imaging devices of FIGS. 1 through 5 depicting a shape drawn on the display area from a third perspective of a third imaging device within the array of imaging devices, according to one example of the principles described herein.
Figure 10:
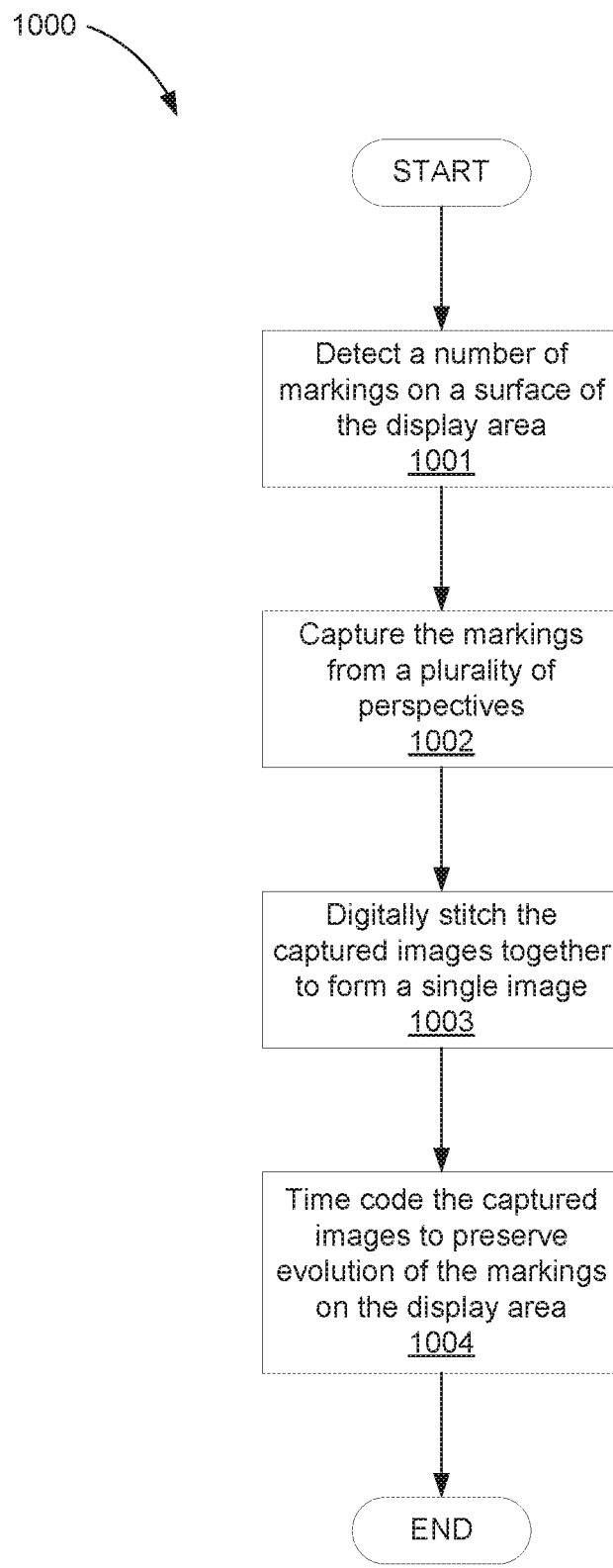
FIG. 10 is a flowchart showing an image stitching process using the curator device of FIG. 5, according to one example of the principles described herein.

The markings (802) may be captured (block 1002) from a plurality of perspectives such as those individually depicted in FIGS. 9A, 9B, 9C. The perspective of FIG. 9A is similar to that depicted in 8A and 8B from the top of the display area (150) down, and directly above the markings (i.e., shape (802). The perspective of FIGS. 9B and 9C is similar to that depicted in 9A but from the top of the display area (150) down, from the left and right of the markings (i.e., shape (802), respectively. Thus, in the example of FIGS. 9A through 10, three images are captured by the image capture devices (303) and/or the sensors (305) of the imaging devices (102) within the array (501) of the interactive display system (FIG. 5, 500).

The process (1000) may continue by digitally stitching (block 1003) the captured images together to form a single image as described herein. The images captured by the plurality of image capture devices (102) may be stitched in order to remove occluded portions of the display area. In the example of FIGS. 9A through 9C, the user's hand (803) and the marking device (805) occlude portions of the shape (802) within the three different perspectives. By stitching the images together, the users hand (803) and the marking device (805) are effectively removed, and a complete picture of the shape (802) is obtained.

Further, in one example, the captured images may be time coded (block 1004) to preserve evolution of the markings (i.e., shape (802) on the display area (150) made throughout the collaborative meeting. In some situations, as user may wish to have memorialized information that was presented part way through the collaborative meeting. The processes described in connection with blocks 1003 and 1004 may be performed by the stitching module (611) of the curator device (502).

Figure 11:
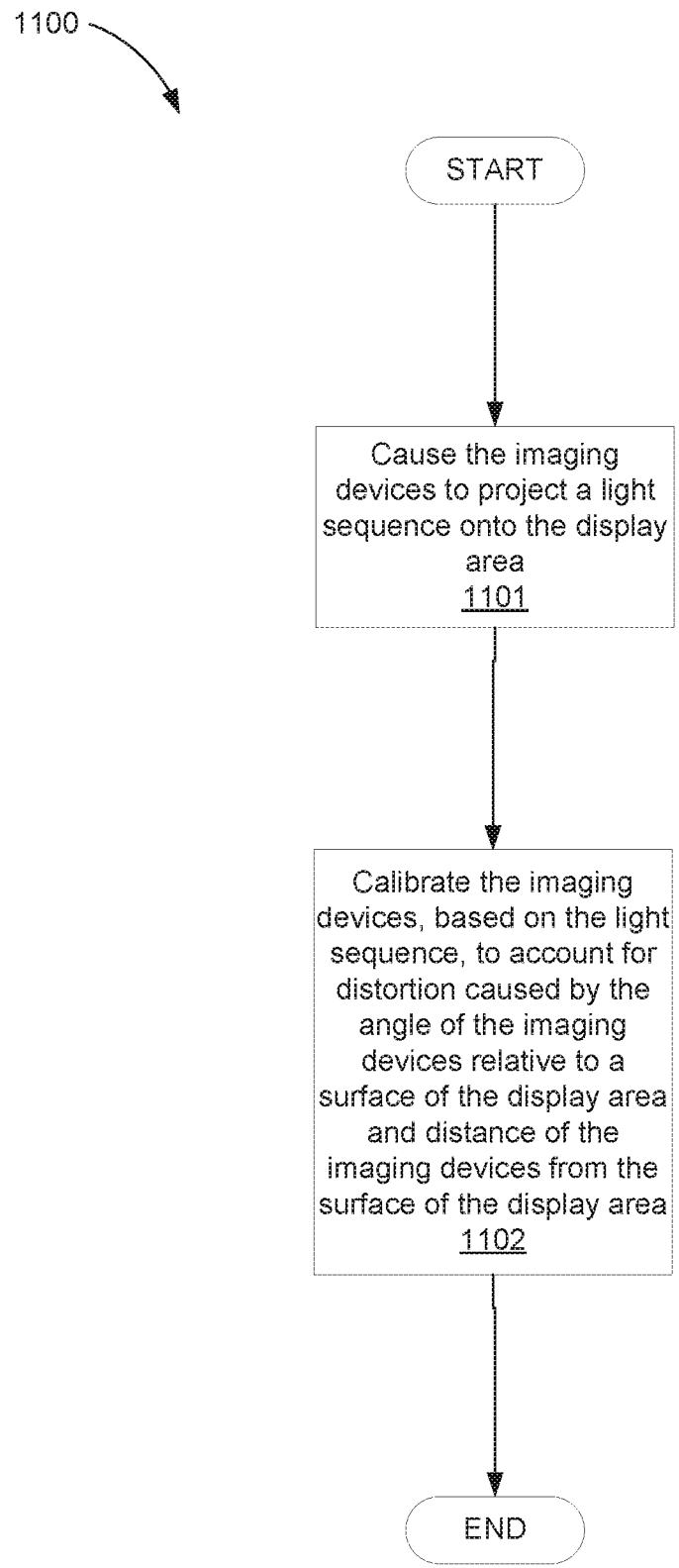
FIG. 11 is a flowchart showing an imaging device calibration process, according to one example of the principles described herein.

FIG. 11 is a flowchart (1100) showing an imaging device calibration process (1100), according to one example of the principles described herein. Calibration of the imaging devices (102) with respect to the one another and the display areas (150) allows for the images captured and projected onto the display area (150) to align and requires less processing with regard to stitching (FIG. 10, 1000). The process may begin by causing (block 1101) the imaging devices (102) to project a light sequence onto the display area (150). In one example, the light sequence may include the projection of horizontal and vertical lines onto the display area (150) using the image projectors (302) of each of the imaging devices (102).

The process (1100) may continue with calibrating (block 1102) the imaging devices, based on the light sequence, to account for distortion caused by the angle of the imaging devices (102) relative to a surface of the display area and distance of the imaging devices from the surface of the display area. The calibration also includes consideration of the field of view of each of the imaging devices (102) and the overlap thereof. The calibration process may be performed initially after install or set-up of the imaging devices (102), after each startup of the imaging devices (102), or on a continuous basis.

FIG. 12 is a flowchart (1200) showing a room switching process, according to one example of the principles described herein. This process may begin by identifying (block 1201), with the room switching module (612), a number of the imaging devices (102) as being associated with a single display area (150). A plurality of the imaging devices (102) are designated (block 1202) by the room switching module (612) as an array (501) of imaging devices (102).

The process may continue by identifying (block 1203) a number of arrays (501) of imaging devices (102) as being associated with a number of different display areas (150). With the room switching module (612), captured data obtained from a first array of imaging devices may be sent (block 1204) from a display area (150) to a second array (501) of imaging devices (102) for display by the second array (501) of imaging devices (102) on a second display area (150).

Aspects of the present system and method are described herein with reference to flowchart illustrations and/or block diagrams of methods, apparatus (systems) and computer program products according to examples of the principles described herein. Each block of the flowchart illustrations and block diagrams, and combinations of blocks in the flowchart illustrations and block diagrams, may be implemented by computer usable program code. The computer usable program code may be provided to a processor of a general purpose computer, special purpose computer, or other programmable data processing apparatus to produce a machine, such that the computer usable program code, when executed via, for example, the processor (601) of the curator device (502) or other programmable data processing apparatus, implement the functions or acts specified in the flowchart and/or block diagram block or blocks. In one example, the computer usable program code may be embodied within a computer readable storage medium; the computer readable storage medium being part of the computer program product. In one example, the computer readable storage medium is a non-transitory computer readable medium.

The examples described herein may be used in a myriad of settings including collaboration in brainstorm and presentation sessions. Further, the examples described herein may be used in sketching, reviewing, and organizing storyboards in the entertainment industry. Still further, examples described herein may be used in engineering and architecture fields to present three-dimensional drawings in an interactive way, allowing for rotating, zooming, and slicing drawings. Interactive advertising in public spaces may also benefit from the examples described herein.

Even still further, examples described herein may be used in education to provide new teaching experiences, content for purchase, and add-ons to textbooks, for example. Still further, examples described herein may be used in an office setting where team collaboration, project management, displaying of slides, planning sessions, retrieval of documents from a cloud repository and annotation of document may be achieved. Examples described herein may even be used in a home environment were interactive TV experiences, art, and games may be enjoyed by the family.

The specification and figures describe an imaging device for an interactive display. The imaging device includes, at least one image projector to project an image onto a display area, a number of image capture devices to capture at least one image of the display area, and a number of sensors to detect the presence of an object within the field of view of the image capture devices. This imaging device for an interactive display may have a number of advantages, including a low-cost, user-friendly system that is easy to install and operate.

The preceding description has been presented to illustrate and describe examples of the principles described. This description is not intended to be exhaustive or to limit these principles to any precise form disclosed. Many modifications and variations are possible in light of the above teaching.

What is claimed is:

1. An interactive display system comprising:
 an imaging head mounted adjacent to a display area, the imaging head comprising:
  an image projector to project an image onto the display area;
  an image capture device comprising a plurality of imaging devices forming an array of imaging devices, the array of imaging devices arranged to capture images from a number of different perspectives defined by positioning of the plurality of imaging devices within the array relative to one another; and
  a plurality of infrared sensors to detect the presence of an object within a field of view of the image capture device.

2. The interactive display system of claim 1, wherein the display area is a whiteboard, and wherein the whiteboard is a passive whiteboard.

3. The interactive display system of claim 1, wherein the imaging device comprises a number of light illumination devices to increase visibility of the display area over ambient illumination.

4. The interactive display system of claim 1, wherein the plurality of infrared sensors detect depth of the object relative to the surface of the display area, location of the object, the type of object, or combinations thereof.

5. The interactive display system of claim 1, further comprising a data synchronization device to:
 synchronize images captured by the plurality of imaging devices.

6. The interactive display system of claim 5, further comprising a data storage device to archive data processed by the data synchronization device.

7. The interactive display system of claim 5, wherein synchronizing images captured by the plurality of image capture devices comprises stitching images captured by the plurality of image capture devices to remove occluded portions of the display area.

8. The interactive display system of claim 1, further comprising a computer program product comprising:
 a computer readable storage medium comprising computer usable program code embodied therewith, the computer usable program code to, when executed by a processor of interactive display system:
  with the plurality of imaging devices:
   detect a number of markings on a surface of the display area;
   capture an image of the markings from a plurality of perspectives;
   digitally stitch the captured images together to form a single image; and
   time code the captured images to preserve evolution of the markings on the display area.

9. The interactive display system of claim 1, further comprising a processor to:
 cause the image projector to project a light sequence onto the display area; and
 calibrate the imaging devices, based on the light sequence, to account for distortion caused by an angle of the imaging devices relative to a surface of the display area and distance of the imaging devices from the surface of the display area.

10. The interactive display system of claim 1, further comprising a processor to:
 identify a number of the imaging devices as being associated with a first display area;
 identify a number of the imaging devices as being associated with a second, different display area;
 stitch together captured data obtained from the imaging devices to eliminate an overlap between imaging of the first display area and second display area.

11. The interactive display system of claim 1, further comprising a curator device to store data output by the imaging devices and sensors and output that data to a second interactive display system at another networked location for output by the second interactive display system.

12. The interactive display system of claim 3, further comprising a light metering device to detect a level of ambient illumination and operate the number of light illumination devices automatically based on the detected level of ambient illumination.

13. The interactive display system of claim 1, further comprising a processor to use output of the imaging devices to identify a change in surfaces at the display area to identify a boundary of the display area.

14. The interactive display system of claim 1, further comprising a curator device to store data output by the imaging devices with time coding to preserve evolution of markings on the display area.

15. The interactive display system of claim 1, further comprising a curator device with an image perspective module to adjust an image output from each imaging device to compensate for distortion due to a perspective of that imaging device.

16. The interactive display system of claim 1, further comprising a curator device with a dynamic content module to recognize markings on the display area as relating to content from another source, to access that related content and to output the related content to the display area via the image projector.

17. The interactive display system of claim 16, wherein the dynamic content module is to recognize a written Universal Resource Locator (URL) on the display area and outputs content from the written URL with the image projector.

18. An interactive display system comprising:
an imaging device mounted adjacent to a display area, the imaging device comprising:
an image projector to project an image onto the display area; and
two image capture devices to each capture at least one image of the display area; and
a plurality of infrared sensors to detect the presence of an object within a field of view of the image capture devices;
wherein a first image capture device comprises a relatively higher resolution image capture device relative to a second image capture device, and
wherein the interactive display system uses the first image capture device to capture images of the display area, and uses the second image capture device to detect position of objects in front of the interactive display system.

19. An interactive display system comprising:
an imaging device mounted adjacent to a display area, the imaging device comprising:
an image projector to project an image onto the display area;
two image capture devices to each capture at least one image of the display area; and
wherein the interactive display system processes data obtained by the image capture devices to identify a body part of a first user relative to another user.

20. The interactive display system of claim 19, further comprising a curator device to store data output by the image capture devices and output that data to a second interactive display system at another networked location for reproduction by the second interactive display system.

* * * * *